US008324295B2

(12) United States Patent
Jia et al.

(10) Patent No.: US 8,324,295 B2
(45) Date of Patent: Dec. 4, 2012

(54) UV-STABILIZED PROTEIN-POLYMER COMPOSITIONS

(75) Inventors: Hongfei Jia, Ann Arbor, MI (US); Songtao Wu, Ann Arbor, MI (US); Masahiko Ishii, Okazaki (JP); Minjuan Zhang, Ann Arbor, MI (US)

(73) Assignees: Toyota Motor Engineering & Manufacturing North America, Inc., Erlanger, KY (US); Toyota Motor Corporation, Toyota (JP)

( * ) Notice: Subject to any disclaimer, the term of this patent is extended or adjusted under 35 U.S.C. 154(b) by 1 day.

(21) Appl. No.: 13/024,794

(22) Filed: Feb. 10, 2011

(65) Prior Publication Data

US 2012/0208923 A1 Aug. 16, 2012

(51) Int. Cl.
*C08L 89/00* (2006.01)

(52) U.S. Cl. ........................................... 524/17; 524/21

(58) Field of Classification Search .................... 524/17, 524/21

See application file for complete search history.

(56) References Cited

U.S. PATENT DOCUMENTS

| | | | |
|---|---|---|---|
| 5,559,163 A | 9/1996 | Dawson et al. | |
| 2004/0109853 A1 | 6/2004 | McDaniel | |
| 2010/0210745 A1 * | 8/2010 | McDaniel et al. | 521/55 |
| 2010/0279376 A1 | 11/2010 | Wang et al. | |

FOREIGN PATENT DOCUMENTS

WO 2009/155115 A2 12/2009

* cited by examiner

*Primary Examiner* — Edward Cain

(74) *Attorney, Agent, or Firm* — Gifford, Krass, Sprinkle, Anderson & Citkowski, P.C.

(57) ABSTRACT

Protein-polymer compositions and processes for their production are provided where the compositions have improved resistance to ultraviolet light induced weathering and associated loss of enzyme activity. The incorporation of both a sterically hindered amine and an ultraviolet light absorber at a concentration of at least 5% by weight produces a curable or cured composition with UV stabilized enzyme activity that can be used as a bioactive coating with improved stain removal properties.

27 Claims, 10 Drawing Sheets

UV-STABILIZED PROTEIN-POLYMER COMPOSITIONS

FIELD OF THE INVENTION

The present invention relates generally to coating compositions including active substances and methods of protecting active substances from weathering by ultraviolet (UV) radiation. In specific embodiments, the invention relates to compositions and methods for stabilizing enzymes in polymeric coatings and substrates.

BACKGROUND OF THE INVENTION

Many outdoor surfaces are subject to stain or insult from natural sources such as bird droppings, resins, and insect bodies. The resulting stain often leaves unpleasant marks on the surface deteriorating the appearance of the products. These insults are particularly distracting on automotive surfaces such as body panels and glass where the presence of a stain can be can be difficult to remove and potentially dangerous due to reduction in the driver's field of vision.

Self-cleaning coatings have been proposed as a way to prevent staining on surfaces. Traditional self-cleaning coatings and surfaces are typically based on water rolling or sheeting to carry away inorganic materials. These show some level of effectiveness for removal of inorganic dirt, but are less effective for cleaning stains from biological sources, which consist of various types of organic polymers, fats, oils, and proteins each of which can deeply diffuse into the subsurface of coatings. Prior art approaches aim to reduce the deposition of stains on a surface and facilitate its removal capitalizing on the "lotus-effect" where hydrophobic, oleophobic and super-amphiphobic properties are conferred to the surface by polymeric coatings containing appropriate nanocomposites. An exemplary coating contains fluorine and silicon nanocomposites with good roll off properties and very high water and oil contact angles. When used on rough surfaces like sandblasted glass, nanocoatings may act as a filler to provide stain resistance. A drawback of these "passive" technologies is that they are not optimal for use in high gloss surfaces because the lotus-effect is based on surface roughness.

Photocatalytic coatings are promising for promoting self-cleaning of organic stains. Upon the irradiation of sun light, a photocatalyst such as $TiO_2$ chemically breaks down organic dirt that is then washed away by the water sheet formed on the super hydrophilic surface. As an example, the photocatalyst $TiO_2$ was used to promote active fingerprint decomposition of fingerprint stains in U.S. Pat. Appl. Publ. 2009/104086. A major drawback to this technology is its limitation to use on inorganic surfaces due to the oxidative impairment of the polymer coating by $TiO_2$. Also, this technology is less than optimal for automotive coatings due to a compatibility issue: $TiO_2$ not only decomposes dirt, but also oxidizes polymer resins in the paint.

Enzyme containing coatings may specifically target biological stain material such as insect stains or bird droppings. Polymer based enzyme containing coatings, however, are subject to polymer degradation by weathering that the prior art attributes to photolysis, photooxidation, or other scission producing chemical reactions in the structure of the polymeric material itself. The result of environmental insults produces alteration in color, chalking, separation of coating layers, cracking, or reduced gloss. These reactions typically occur on long time scales of continued use in harsh environments.

Therefore, there is a need for new materials or coatings that can actively promote the long term active removal of organic stains on surfaces or in coatings and minimize the requirement for maintenance cleaning.

SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

A protein-polymer composition is provided that has improved enzyme stability to ultraviolet induced weathering. A composition includes a polymer resin, a cross-linker, a bioactive enzyme and at least two ultraviolet light stabilizers. At least one light stabilizer is a sterically hindered amine, and at least one light stabilizer is a UV absorber. A UV absorber is present at a concentration in excess of 5% by weight.

The sterically hindered amine is optionally present at 1% by weight. Some embodiments include 2,4-bis[N-Butyl-N-(1-cyclohexyloxy-2,2,6,6-tetramethylpiperidin-4-yl)amino]-6-(2-hydroxyethylamine)-1,3,5-triazine as a sterically hindered amine. A UV absorber is also included. Unexpectedly, the presence of a sterically hindered amine synergistically functions along with a UV absorber to protect enzyme function when incorporated into a protein-polymer composition. In some embodiments, the UV absorber has a 10% cut-off at a wavelength at or in excess of 380 nm. Optionally, the UV absorber has a band reject of 10% transmission or less in the wavelength range from 280 nanometers to 380 nanometers. This provides a composition with maximal protection of enzyme function. While the weight percent of UV absorber is in excess of 5%, some embodiments include a UV absorber at a final concentration of 8% by weight or greater.

Also provided are processes for preparing a UV stabilized protein-polymer composite material including providing an admixture of a polymer resin, a surfactant, a non-aqueous organic solvent, a sterically hindered amine, and a UV absorber, where the UV absorber is present at sufficient amounts to yield a final composition that is at least 5% by weight of the UV absorber; mixing an aqueous solution containing isolated bioactive enzymes with the admixture, wherein the aqueous solution is substantially free of surfactant, to produce an emulsion; mixing the emulsion with a crosslinker to produce a curable composition; and curing the curable composition, thereby producing the UV stabilized protein-polymer composite material.

A process for stabilizing an enzyme against loss of activity due to weathering from ultraviolet light is also provided, the process including adding to a protein-polymer composition wherein the protein is an enzyme, at least two ultraviolet light stabilizers. At least one light stabilizer is a sterically hindered amine, and at least one light stabilizer is a UV absorber where the UV absorber is present at a concentration in excess of 5% by weight.

DETAILED DESCRIPTION OF EMBODIMENTS OF THE INVENTION

Figure 1:
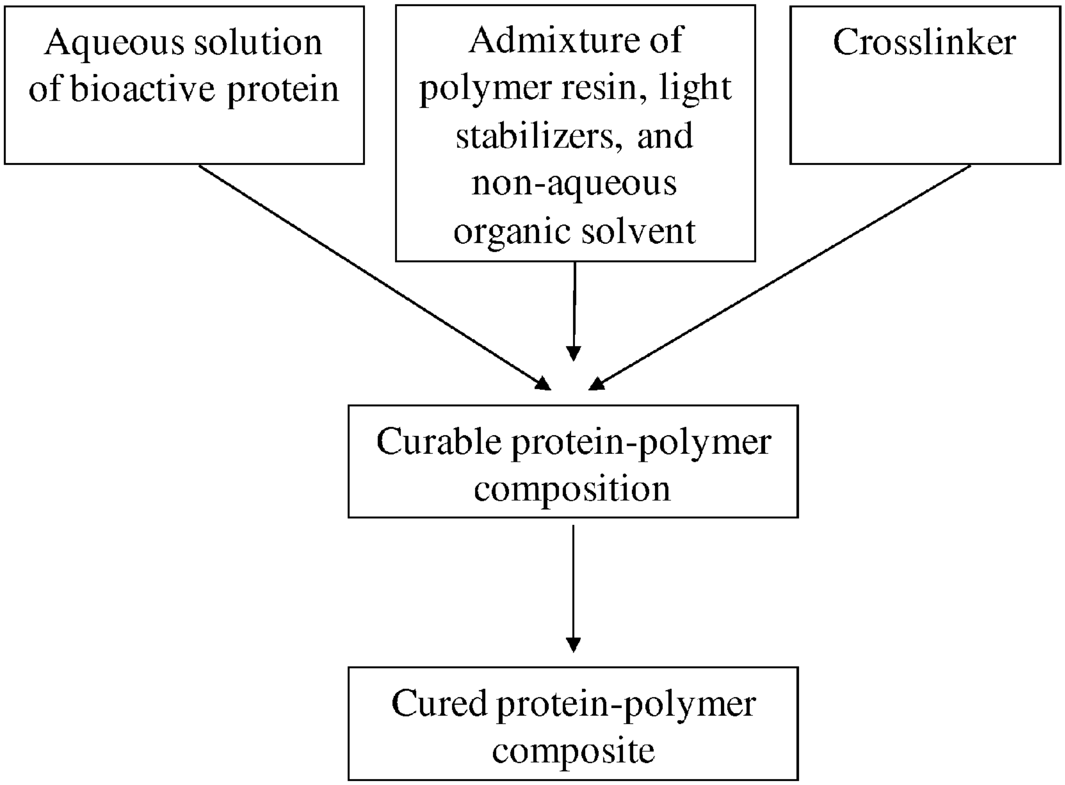
FIG. 1 is a schematic of a process for making a protein-polymer composition for use in an embodiment of a coating.

The following description of embodiment(s) of the invention is merely exemplary in nature and is in no way intended to limit the scope of the invention, its application, or uses, which may, of course, vary. The invention is described with relation to the non-limiting definitions and terminology included herein. These definitions and terminology are not designed to function as a limitation on the scope or practice of the invention, but are presented for illustrative and descriptive purposes only.

The inventions disclosed herein are based on the catalytic activity of an enzyme to promote active stain removal or to prevent adherence of environmental or biological material to a coating or surface. The prior art adds anti-weathering agents such as UV stabilizers to a polymeric coating material to prevent damage to the polymeric coating itself from UV light over long time scales or severe weathering conditions. These and other prior investigators assumed that weathering at short timescales not expected to damage the polymeric material would have no substantial affect on the activity of an embedded enzyme. These assumptions are based on studies that embedded enzymes are stable when a coating is subjected to heat as a weathering agent. The inventors of the current invention surprisingly, and in contrast to assumptions made by the prior art, discovered that, unlike heat, enzymes embedded in a polymeric coating or substrate show reduced activity when subjected to UV light that causes no visible structural damage to the coating itself. Moreover, the wavelength range of the UV light causing this reduction in activity was discovered to have a narrow bandwidth, such that all UV light is not equal in reducing enzyme activity. For example, middle UV light and visible light at short wavelengths have little affect on polymer embedded enzyme activity whereas near UV light (280 nm to 400 nm) exposure will reduce enzyme activity by as much as 70% after as little as 48 hours of exterior weathering testing.

Protein containing polymeric coatings or substrates with particular UV protectants are provided. The protein is either immobilized into or on coatings or substrates and catalyzes the degradation of biological or environmental stain components into smaller molecules. The product molecules may be less strongly adherent to a surface or coating such that gentle rinsing with water, air, or other fluid promotes removal of the biological material from the surface or coating. Thus, the invention has utility as a composition and method for the UV stabilized active removal of stains from surfaces.

It is appreciated that while the description herein is directed to coatings, the materials described herein may also be substrates or articles that do not require a coating thereon for promotion of functional stain removal. As such, the word "coating" as used herein means a material that is operable for layering on a surface of one or more substrates, or may comprise the substrate material itself. The methods and compositions disclosed herein are generally referred to as a protein associated with a coating for exemplary purposes only. One of ordinary skill in the art appreciates that the description is equally applicable to substrates themselves.

An inventive composition includes a coating with an enzymatically active protein capable of degrading one or more components of an organic stain. In particular embodiments, an organic stain is based on bioorganic matter such as that derived from an insect, optionally an insect body, a plant, or from the environment.

A biological stain as defined herein is a bioorganic stain, mark, or residue left behind after an organism contacts a substrate or coating. A biological stain is not limited to marks or residue left behind after a coating is contacted by an insect body. Other sources of bioorganic stains are illustratively: insect wings, legs, or other appendages; bird droppings; fingerprints or residue left behind after a coating is contacted by an organism; or other sources of organic stains including the environment.

A protein as used herein refers to a composition with a peptide bond such as a peptide (i.e. 3 to 100 amino acids), polypeptide (i.e. 101 or more amino acids), or other covalent combination of natural, synthetic, or derivative amino acids. A protein is a molecule with a contiguous molecular sequence three amino acids or greater in length, optionally matching the length of a biologically produced proteinaceous molecule encoded by the genome of an organism. Examples of proteins include an enzyme, an antibody, a receptor, a transport protein, a structural protein, or a combination thereof. Proteins are capable of specifically interacting with another substance, such as a ligand, drug, substrate, antigen, or hapten.

A protein optionally has activity to convert a substrate molecule to a produce a product and is termed an enzyme. An enzyme is optionally a bioactive enzyme. A bioactive enzyme is capable of cleaving a chemical bond in a molecule that is found in a biological organism or in food. An enzyme is optionally a protease that is capable of cleaving a peptide bond illustratively including bacterial protease, or analogue thereof. A protein that functions as an enzyme is optionally identical to the wild-type amino acid sequence encoded by an isolated gene, a functional equivalent of such a sequence, or a combination thereof. A protein is referred to as "wild-type" if it has an amino acid sequence that matches the sequence of a protein as found in an organism in nature. It is appreciated that a protein is optionally a functional equivalent to a wild-type enzyme, which includes a sequence and/or a structural analogue of a wild-type protein's sequence and/or structure and functions as an enzyme. The functional equivalent enzyme may possess similar or the same enzymatic properties as a wild-type enzyme, such as catalyzing chemical reactions of the wild-type enzyme's EC classification; and/or may possess other enzymatic properties, such as catalyzing the chemical reactions of in enzyme related to the wild-type enzyme by sequence and/or structure. An enzyme encompasses its functional equivalents that catalyze the reaction catalyzed by the wild-type form of the enzyme (e.g., the reaction used for EC Classification). For example, the term "amylase" encompasses any functional equivalent of an amylase that retains amylase activity though the activity may be altered such as by increased reaction rates, decreased reaction rates, altered substrate preference, increased or decreased substrate binding affinity, etc. Examples of functional equivalents include mutations to a wild-type enzyme sequence, such as a sequence truncation, an amino acid substitution, an amino acid modification, and/or a fusion protein, etc., wherein the altered sequence functions as an enzyme.

As used herein, the term "derived" refers to a protein's progenitor source. It is appreciated that the protein may include a wild-type and/or a functional equivalent of the original source protein. The term "derived" encompasses both wild-type and functional equivalents. For example, a coding sequence for a *Homo sapiens* enzyme may be mutated and recombinantly expressed in bacteria, but the enzyme, whether isolated and/or including other bacterial cellular material(s) is an enzyme "derived" from *Homo sapiens*. In another example, a wild-type enzyme isolated from an endogenous biological source, such as, for example, a *Pseudomonas putida* lipase isolated from *Pseudomonas putida*, is an enzyme "derived" from *Pseudomonas putida*.

In some cases, a protein is a hybrid of various sequences, such as a fusion of a mammalian amylase and a non-mammalian amylase and the resulting protein is considered to be derived from both sources. Proteins may be derived, isolated, or produced in a wild-type or a functional equivalent form.

A protein as a component of a protein-polymer composition is optionally an enzyme with the activity of an oxioreducatse (EC1), transferase (EC2), hydrolase (EC3), lyase (EC4), isomerase (EC5), or ligase (EC6). Enzymes in any of these categories can be included in a protein-polymer composite material according to embodiments of the present invention. Illustrative examples of proteins that function as enzymes are included in U.S. Patent Application Publication No: 2010/0210745, the contents of which are incorporated herein by reference.

In some embodiments, an included enzyme is a hydrolase, such as a glucosidase, protease, or lipase. Non-limiting examples of particular glucosidases include amylase, chitinase and lysozyme. Non-limiting examples of particular proteases include trypsin, chymotrypsin, thermolysin, subtilisin, papain, elastase, and plasminogen. Non-limiting examples of lipases include pancreatic lipase and lipoprotein lipase.

Amylase is an enzyme present in some embodiments of a protein-polymer composition. Amylases have activity that break down starch. Several types of amylases are operable herein illustratively including α-amylase (EC 3.2.1.1) responsible for endohydrolysis of (1->4)-alpha-D-glucosidic linkages in oligosaccharides and polysaccharides. α-Amylase is illustratively derived from *Bacillus subtilis* and has the sequence found at Genbank Accession No: ACM91731, or an analogue thereof. A specific example is α-amylase from *Bacillus subtilis* available from Sigma-Aldrich Co., St. Louis, Mo. Additional α-amylases include those derived from *Geobacillus stearothermophilus* (Accession No: AAA22227), *Aspergillus oryzae* (Accession No: CAA31220), *Homo sapiens* (Accession No: BAA14130), *Bacillus amyloliquefaciens* (Accession No: ADE44086), *Bacillus licheniformis* (Accession No: CAA01355), or other organism, or analogues thereof. It is appreciated that β-amylases, γ-amylases, or analogues thereof from a variety of organisms are similarly operable in a protein-polymer composition.

Other examples of proteins operable herein include metalloproteases such as a member of the M4 family of bacterial thermolysin-like proteases of which thermolysin is the prototype protease (EC 3.4.24.27), or analogues thereof. A protease is optionally the bacterial neutral thermolysin-like-protease (TLP) derived from *Bacillus stearothermophilus* (*Bacillus thermoproteolyticus* Var. *Rokko*) (illustratively sold under the trade name "Thermoase C160" available from Amano Enzyme U.S.A., Co. (Elgin, Ill.)), or analogues thereof. A protease is optionally any protease presented in de Kreig, et al., *J Biol Chem,* 2000; 275(40):31115-20, the contents of which are incorporated herein by reference. Illustrative examples of a protease include the thermolysin-like-proteases from *Bacillis cereus* (Accession No. P05806), *Lactobacillis* sp. (Accession No. Q48857), *Bacillis megaterium* (Accession No. Q00891), *Bacillis* sp. (Accession No. Q59223), *Alicyclobacillis acidocaldarious* (Accession No. Q43880), *Bacillis caldolyticus* (Accession NO. P23384), *Bacillis thermoproteolyticus* (Accession No. P00800), *Bacillus stearothermophilus* (Accession No. P43133), *Bacillus subtilis* (Accession No. P06142), *Bacillus amyloliquefaciens* (Accession No. P06832), *Lysteria monocytogenes* (Accession No: P34025; P23224), among others known in the art.

The sequences at each accession number listed herein are incorporated herein by reference. Methods of cloning, expressing, and purifying any protein operable herein is achievable by methods ordinarily practiced in the art illustratively by methods disclosed in: Molecular Cloning: A Laboratory Manual, 2nd ed., vol. 1-3, ed. Sambrook et al., Cold Spring Harbor Laboratory Press, Cold Spring Harbor, N.Y., 1989; Current Protocols in Molecular Biology, ed. Ausubel et al., Greene Publishing and Wiley-Interscience, New York, 1992 (with periodic updates); and Short Protocols in Molecular Biology, ed. Ausubel et al., 52 ed., Wiley-Interscience, New York, 2002, the contents of each of which are incorporated herein by reference.

Specific examples of amylase enzymes illustratively have 1000 U/g protease activity or more wherein one (1) U (unit) is defined as the amount of enzyme that will liberate the non-protein digestion product form potato starch of Zulkowsky (e.g. starch, treated with glycerol at 190° C.; *Ber. Deutsch. Chem. Ges,* 1880; 13:1395). Illustratively, the protease has activity anywhere at or between 1,000 U/g to 500,000 U/g, or greater. It is appreciated that lower protease activities are operable.

A protein optionally functions associated with one or more cofactor ions or cofactor proteins. A cofactor ion is illustratively zinc, cobalt, or calcium.

A protein is optionally an analogue of a wild-type protein. An analogue of a protein has an amino acid sequence that when placed in similar conditions to a wild-type protein possess some level of the activity of a wild-type enzyme toward the same substrate. An analogue optionally has 500%, 250%, 200%, 150%, 110%, 99%, 98%, 97%, 96%, 95%, 94%, 93%, 92%, 91%, 90%, 85%, 80%, 75%, 70%, 60%, 50%, 25%, 10%, 5%, or any value or range of values therebetween, the activity of a wild-type protein. Any modification to a wild-type protein may be used to generate an analogue. Illustratively, amino acid substitutions, additions, deletions, cross-linking, removal or addition of disulfide bonds, or other modification to the sequence or any member of the sequence may be used to generate an analogue. An analogue is optionally a fusion protein that includes the sequences of two or more wild-type proteins, fragments thereof, or sequence analogues thereof.

Methods of screening for protein activity are known and standard in the art. Illustratively, screening for activity of an enzyme or analogue thereof illustratively includes contacting an enzyme or analogue thereof with a natural or synthetic substrate of an enzyme and measuring the enzymatic cleavage of the substrate. Illustrative substrates for this purpose include casein of which is cleaved by a protease to liberate folin-positive amino acids and peptides (calculated as tyrosine) that are readily measured by techniques known in the art. The synthetic substrate furylacryloylated tripeptide 3-(2-furylacryloyl)-L-glycyl-L-leucine-L-alanine obtained from Bachem AG, Bubendorf, Switzerland is similarly operable. Illustrative substrates of α-amylase include long chain carbohydrates such as amylose or amylopectin that make up starch. Other methods of screening for α-amylase activity include the colorimetric assay of Fischer and Stein, *Biochem. Prep.,* 1961, 8, 27-33, the contents of which are incorporated herein by reference. It is appreciated that one of ordinary skill in the art can readily envision methods of screening for enzyme activity with the enzyme present in or on a variety of materials.

Amino acids present in a protein or analogue thereof include the common amino acids alanine, cysteine, aspartic acid, glutamic acid, phenylalanine, glycine, histidine, isoleucine, lysine, leucine, methionine, asparagine, proline, glutamine, arginine, serine, threonine, valine, tryptophan, and tyrosine; as well as less common naturally occurring amino acids, modified amino acids or synthetic compounds, such as alpha-asparagine, 2-aminobutanoic acid or 2-aminobutyric acid, 4-aminobutyric acid, 2-aminocapric acid (2-aminodecanoic acid), 6-aminocaproic acid, alpha-glutamine, 2-aminoheptanoic acid, 6-aminohexanoic acid, alpha-aminoisobutyric acid (2-aminoalanine), 3-aminoisobutyric acid, beta-alanine, allo-hydroxylysine, allo-isoleucine, 4-amino-7-methylheptanoic acid, 4-amino-5-phenylpentanoic acid, 2-aminopimelic acid, gamma-amino-beta-hydroxybenzenepentanoic acid, 2-aminosuberic acid, 2-carboxyazetidine, beta-alanine, beta-aspartic acid, biphenylalanine, 3,6-diaminohexanoic acid, butanoic acid, cyclobutyl alanine, cyclohexylalanine, cyclohexylglycine, N5-aminocarbonylornithine, cyclopentyl alanine, cyclopropyl alanine, 3-sulfoalanine, 2,4-diaminobutanoic acid, diaminopropionic acid, 2,4-diaminobutyric acid, diphenyl alanine, N,N-dimethylglycine, diaminopimelic acid, 2,3-diaminopropanoic acid, S-ethylthiocysteine, N-ethylasparagine, N-ethylglycine, 4-aza-phenylalanine, 4-fluoro-phenylalanine, gamma-glutamic acid, gamma-carboxyglutamic acid, hydroxyacetic acid, pyroglutamic acid, homoarginine, homocysteic acid, homocysteine, homohistidine, 2-hydroxyisovaleric acid, homophenylalanine, homoleucine, homoproline, homoserine, homoserine, 2-hydroxypentanoic acid, 5-hydroxylysine, 4-hydroxyproline, 2-carboxyoctahydroindole, 3-carboxylsoquinoline, isovaline, 2-hydroxypropanoic acid (lactic acid), mercaptoacetic acid, mercaptobutanoic acid, sarcosine, 4-methyl-3-hydroxyproline, mercaptopropanoic acid, norleucine, nipecotic acid, nortyrosine, norvaline, omega-amino acid, ornithine, penicillamine (3-mercaptovaline), 2-phenylglycine, 2-carboxypiperidine, sarcosine (N-methylglycine), 2-amino-3-(4-sulfophenyl)propionic acid, 1-amino-1-carboxycyclopentane, 3-thienylalanine, epsilon-N-trimethyllysine, 3-thiazolylalanine, thiazolidine 4-carboxylic acid, alpha-amino-2,4-dioxopyrimidinepropanoic acid, and 2-naphthylalanine. A protein optionally has between 3 and about 1000 amino acids or having a molecular weight in the range of about 150-350,000 Daltons.

A protein is obtained by any of various methods known in the art illustratively including isolation from a cell or organism, chemical synthesis, expression of a nucleic acid sequence, and partial hydrolysis of proteins. Chemical methods of peptide synthesis are known in the art and include solid phase peptide synthesis and solution phase peptide synthesis or by the method of Hackeng, T M, et al., *Proc Natl Acad Sci USA,* 1997; 94(15):7845-50, the contents of which are incorporated herein by reference. A protein may be a naturally occurring or non-naturally occurring protein. The term "naturally occurring" refers to a protein endogenous to a cell, tissue or organism and includes allelic variations. A non-naturally occurring protein is synthetic or produced apart from its naturally associated organism or modified and is not found in an unmodified cell, tissue or organism.

Modifications and changes can be made in the structure of a protein and still obtain a molecule having similar characteristics as a wild-type protein (e.g., a conservative amino acid substitution). For example, certain amino acids can be substituted for other amino acids in a sequence without appreciable loss of activity or optionally to reduce or increase the activity of an unmodified protein. Because it is the interactive capacity and nature of a polypeptide sequence that defines that polypeptide's biological functional activity, certain amino acid sequence substitutions can be made in a protein sequence and nevertheless obtain a protein with like or other desired properties.

In making such changes, the hydropathic index of amino acids can be considered. The importance of the hydropathic amino acid index in conferring interactive biologic function on a protein is generally understood in the art. It is known that certain amino acids can be substituted for other amino acids having a similar hydropathic index or score and still result in a protein with similar biological activity. Each amino acid has been assigned a hydropathic index on the basis of its hydrophobicity and charge characteristics. Those indices are: isoleucine (+4.5); valine (+4.2); leucine (+3.8); phenylalanine (+2.8); cysteine/cysteine (+2.5); methionine (+1.9); alanine (+1.8); glycine (−0.4); threonine (−0.7); serine (−0.8); tryptophan (−0.9); tyrosine (−1.3); proline (−1.6); histidine (−3.2); glutamate (−3.5); glutamine (−3.5); aspartate (−3.5); asparagine (−3.5); lysine (−3.9); and arginine (−4.5).

It is believed that the relative hydropathic character of the amino acid determines the secondary structure of the resultant protein, which in turn defines the interaction of the protein with other molecules, such as enzymes, substrates, receptors, antibodies, antigens, cofactors, and the like. It is known in the art that an amino acid can be substituted by another amino acid having a similar hydropathic index and still obtain a functionally equivalent protein. In such changes, the substitution using amino acids whose hydropathic indices are within ±2, those within ±1, and those within ±0.5 are optionally used.

Substitution of like amino acids can also be made on the basis of hydrophilicity. The following hydrophilicity values have been assigned to amino acid residues: arginine (+3.0); lysine (+3.0); aspartate (+3.0±1); glutamate (+3.0±1); serine (+0.3); asparagine (+0.2); glutamine (+0.2); glycine (0); proline (−0.5±1); threonine (−0.4); alanine (−0.5); histidine (−0.5); cysteine (−1.0); methionine (−1.3); valine (−1.5); leucine (−1.8); isoleucine (−1.8); tyrosine (−2.3); phenylalanine (−2.5); tryptophan (−3.4). It is understood that an amino acid can be substituted for another having a similar hydrophilicity value and still obtain an enzymatically equivalent protein. In such changes, the substitution of amino acids whose hydrophilicity values are within ±2, those within ±1, and those within ±0.5 are optionally used.

Amino acid substitutions are optionally based on the relative similarity of the amino acid side-chain substituents, for example, their hydrophobicity, hydrophilicity, charge, size, and the like. Exemplary substitutions that take various of the foregoing characteristics into consideration are well known to those of skill in the art and include (original residue: exemplary substitution): (Ala: Gly, Ser), (Arg: Lys), (Asn: Gln, His), (Asp: Glu, Cys, Ser), (Gln: Asn), (Glu: Asp), (Gly: Ala), (His: Asn, Gln), Leu, Val), (Leu: He, Val), (Lys: Arg), (Met: Leu, Tyr), (Ser: Thr), (Thr: Ser), (Tip: Tyr), (Tyr: Trp, Phe), and (Val: Ile, Leu). Embodiments of this disclosure thus contemplate functional or biological equivalents of a protein. In particular, embodiments of the proteins can include analogues having about 50%, 60%, 70%, 80%, 90%, 95%, 99%, or any value or range therebetween, sequence identity to a wild-type protein.

The above characteristics are optionally taken into account when producing a protein with reduced or improved enzymatic activity. Illustratively, substitutions in a substrate binding site, exosite, cofactor binding site, catalytic site, or other site in an enzyme may alter the activity of the enzyme toward a substrate. In considering such substitutions the sequences of other known naturally occurring or non-naturally occurring proteins may be taken into account. Illustratively, mutations of L134R and S320A in *Bacillis licheniformis* α-amylase improve the catalytic activity of the enzyme in acidic conditions 14-fold. Liu, et al., *Appl Microbiol Biotechnol,* 2008; 80:795-803. As another example, a corresponding mutation to that of Asp213 in thermolysin is operable such as that done by Mild, Y, et al., *Journal of Molecular Catalysis B: Enzymatic,* 1996; 1:191-199. Optionally, a substitution in thermolysin of L144S alone or along with substitutions of G8C/N60C/S65P are operable to increase the catalytic efficiency by 5-10 fold over the wild-type enzyme. Yasukawa, K, and Inouye, K, *Biochimica et Biophysica Acta* (*BBA*)—*Proteins* & *Proteomics,* 2007; 1774:1281-1288, the contents of which are incorporated herein by reference. The mutations in the bacterial neutral protease from *Bacillus stearothermophilus* of N116D, Q119R, D150E, and Q225R as well as other mutations similarly increase catalytic activity. De Kreig, A, et al., *J. Biol. Chem.,* 2002; 277:15432-15438, the contents of which are incorporated herein by reference. De Kreig also teach several substitutions including multiple substitutions that either increase or decrease the catalytic activity of the protease. Id. and De Kreig, *Eur J Biochem,* 2001; 268(18): 4985-4991, the contents of which are incorporated herein by reference. Other substitutions at these or other sites optionally affect enzymatic activity. It is within the level of skill in the art and routine practice to undertake site directed mutagenesis and screen for subsequent protein activity illustratively by the methods of De Kreig, *Eur J Biochem,* 2001; 268(18):4985-4991 for which this reference is similarly incorporated herein by reference.

A protein is optionally recombinant. Methods of cloning, synthesizing or otherwise obtaining nucleic acid sequences encoding a protein are known and standard in the art that are equally applicable to amylases or other proteins present in an inventive protein-polymer composition. Similarly, methods of cell transfection and protein expression are similarly known in the art and are applicable herein.

A protein may be coexpressed with associated tags, modifications, other proteins such as in a fusion protein, or other modifications or combinations recognized in the art. Illustrative tags include 6×His, FLAG, biotin, ubiquitin, or SUMO. A tag is illustratively cleavable such as by linking α-amylase or an associated protein via an enzyme cleavage sequence that is cleavable by an enzyme known in the art illustratively including Factor Xa, thrombin, SUMOstar™ protein as obtainable from Lifesensors, Inc., Malvern, Pa., or trypsin. It is further appreciated that chemical cleavage is similarly operable with an appropriate cleavable linker.

Protein expression is illustratively accomplished from transcription of a nucleic acid sequence and translation of RNA transcribed from the nucleic acid sequence or analogues thereof. An analogue of a nucleic acid sequence is any sequence that when translated to protein will produce a protein analogue. Protein expression is optionally performed in a cell based system such as in *E. coli*, Hela cells, or Chinese hamster ovary cells. It is appreciated that cell-free expression systems are similarly operable.

It is recognized that numerous analogues of proteins are operable and within the scope of the present invention including amino acid substitutions, alterations, modifications, or other amino acid changes that increase, decrease, or do not alter the function of the protein. Several post-translational modifications are similarly envisioned as within the scope of the present invention illustratively including incorporation of a non-naturally occurring amino acid, phosphorylation, glycosylation, addition of pendent groups such as biotin, fluorophores, lumiphores, radioactive groups, antigens, or other molecules.

An inventive composition includes one or more proteins incorporated into a substrate itself or into a coating material. The protein is optionally non-covalently associated and/or covalently attached to the substrate or coating material or is otherwise associated therewith such as by bonding to the surface or by intermixing with the substrate/coating material during manufacture such as to produce entrapped protein. In some embodiments, the protein is covalently attached to the substrate or coating material either by direct covalent interaction between the protein and one or more components of the substrate or coating material or by association via a link moiety such as that described in U.S. Pat. App. Publ. No. 2008/0119381, the contents of which are incorporated herein by reference.

There are several ways to associate protein with a substrate or coating, one of which involves the application of covalent bonds. Specifically, free amine groups of the protein may be covalently bound to an active group of the substrate. Such active groups include alcohol, thiol, aldehyde, carboxylic acid, anhydride, epoxy, ester, or any combination thereof. This method of incorporating protein delivers unique advantages. First, the covalent bonds tether the proteins permanently to the substrate and place them as an integral part of the final composition with much less, if any at all, leakage of the protein. Second, the covalent bonds provide extended enzyme functional lifetime. Over time, proteins typically lose activity because of the unfolding of their polypeptide chains. Covalent bonding effectively restricts such unfolding, and thus improves the protein life. The life of a protein is typically determined by comparing the amount of activity reduction of a protein that is free or being physically adsorbed with that of a protein covalently-immobilized over a period of time.

Proteins are optionally uniformly dispersed throughout the polymer network to create a substantially homogenous protein platform. In so doing, proteins may be first modified with polymerizable groups. The modified proteins may be solubilized into organic solvents in the presence of surfactant, and thus engage the subsequent polymerization with monomers such as methyl methacrylate (MMA) or styrene in the organic solution. The resulting composition optionally includes protein molecules homogeneously dispersed throughout the network.

Proteins are optionally attached to surfaces of a substrate. An attachment of proteins corresponding to approximately 100% surface coverage was achieved with polystyrene particles with diameters range from 100 to 1000 nm.

Chemical methods of protein attachment to materials will naturally vary depending on the functional groups present in the protein and in the material components. Many such methods exist. For example, methods of attaching proteins (such as enzymes) to other substances are described in O'Sullivan et al, *Methods in Enzymology,* 1981; 73:147-166 and Erlanger, *Methods in Enzymology,* 1980; 70:85-104, each of which are herein incorporated herein by reference.

Proteins are optionally present in a coating that is layered upon a substrate wherein the protein is optionally entrapped in the coating material, admixed therewith, modified and integrated into the coating material or layered upon a coating similar to the mechanisms described for interactions between a protein and substrate material.

Materials operable for interactions with a protein to form an active substrate or coating illustratively include organic polymeric materials. The combination of these materials and a protein form a protein-polymer composite material that is used as a substrate material or a coating.

Methods of preparing protein-polymer composite materials illustratively include use of aqueous solutions of protein and non-aqueous organic solvent-borne polymers to produce enzymatically active organic solvent-borne protein-polymer composite materials.

Methods of preparing protein-polymer composite materials are illustratively characterized by dispersion of protein in solvent-borne resin prior to curing, in contrast to forming large aggregates of proteins that diminish their functionality and the protein-polymer composite materials. Proteins are optionally dispersed in the protein-polymer composite material such that the dispersed proteins are unassociated with other proteins and/or form relatively small particles of associated proteins. Illustratively, the average particle size of lipase particles in the protein-polymer composite material is less than 10 μm (average diameter) such as in the range of 1 nm to 10 μm, inclusive.

Curable protein-polymer compositions are optionally two-component solvent-borne (2K SB) compositions. Optionally, one component systems (1K) are similarly operable. Illustratively, a protein is entrapped in a coating material such as a latex or enamel paint, varnish, polyurethane gels, or other coating materials. Illustrative examples of incorporating enzymes into paints are presented in U.S. Pat. No. 5,998,200, the contents of which are incorporated herein by reference.

In two-component systems, the two components are optionally mixed shortly before use, for instance, application of the curable protein-polymer composition to a substrate to form a protein containing coating such as a bioactive clear coat. Generally described, the first component contains a crosslinkable polymer resin and the second component contains a crosslinker. Thus, the emulsion is a first component containing a crosslinkable resin and the crosslinker is a second component, mixed together to produce the curable protein-polymer composition.

A polymer resin included in methods and compositions of the present invention can be any film-forming polymer useful in coating or substrate compositions, illustratively clear coat compositions. Polymers illustratively include, aminoplasts, melamine formaldehydes, carbamates, polyurethanes, polyacrylates, epoxies, polycarbonates, alkyds, vinyls, polyamides, polyolefins, phenolic resins, polyesters, polysiloxanes, and combinations of any of these or other polymers.

In particular embodiments, a polymer resin is crosslinkable. Illustratively, a crosslinkable polymer has a functional group characteristic of a crosslinkable polymer. Examples of such functional groups illustratively include acetoacetate, acid, amine, carboxyl, epoxy, hydroxyl, isocyanate, silane, vinyl, other operable functional groups, and combinations thereof.

A cross linking agent is optionally included in the composition. The particular crosslinker selected depends on the particular polymer resin used. Non-limiting examples of crosslinkers include compounds having functional groups such as isocyanate functional groups, epoxy functional groups, aldehyde functional groups, and acid functionality.

In particular embodiments of protein-polymer composite materials, a polymer resin is a hydroxyl-functional acrylic polymer and the crosslinker is a polyisocyanate.

A polyisocyanate, optionally a diisocyanate, is a crosslinker reacted with the hydroxyl-functional acrylic polymer according to embodiments of the present invention. Aliphatic polyisocyanates are optional polyisocyanates used in processes for making protein-polymer composite materials for clearcoat applications such as in automotive clearcoat applications. Non-limiting examples of aliphatic polyisocyanates include 1,4-butylene diisocyanate, 1,4-cyclohexane diisocyanate, 1,2-diisocyanatopropane, 1,3-diisocyanatopropane, ethylene diisocyanate, lysine diisocyanate, 1,4-methylene bis(cyclohexyl isocyanate), diphenylmethane 4,4'-diisocyanate, an isocyanurate of diphenylmethane 4,4'-diisocyanate, methylenebis-4,4'-isocyanatocyclohexane, 1,6-hexamethylene diisocyanate, an isocyanurate of 1,6-hexamethylene diisocyanate, isophorone diisocyanate, an isocyanurate of isophorone diisocyanate, p-phenylene diisocyanate, toluene diisocyanate, an isocyanurate of toluene diisocyanate, triphenylmethane 4,4',4"-triisocyanate, tetramethyl xylene diisocyanate, and meta-xylene diisocyanate.

Curing modalities are those typically used for conventional curable polymer compositions such as time, heat, UV-light, or other curing modality known in the art.

Protein-polymer composite materials used in embodiments of the present invention are optionally thermoset protein-polymer composite materials. For example, a substrate or coating material is optionally cured by thermal curing. A thermal polymerization initiator is optionally included in a curable composition. Thermal polymerization initiators illustratively include free radical initiators such as organic peroxides and azo compounds. Examples of organic peroxide thermal initiators illustratively include benzoyl peroxide, dicumylperoxide, and lauryl peroxide. An exemplary azo compound thermal initiator is 2,2'-azobisisobutyronitrile.

Conventional curing temperatures and curing times can be used in processes according to embodiments of the present invention. For example, the curing time at specific temperatures, or under particular curing conditions, is determined by the criteria that the cross-linker functional groups are reduced to less than 5% of the total present before curing. Cross-linker functional groups can be quantitatively characterized by FT-IR or other suitable method. For example, the curing time at specific temperatures, or under particular curing conditions, for a polyurethane protein-polymer composite of the present invention can be determined by the criteria that the cross-linker functional group NCO is reduced to less than 5% of the total present before curing. The NCO group can be quantitatively characterized by FT-IR. Additional methods for assessing the extent of curing for particular resins are well-known in the art. Illustratively, curing may include evaporation of a solvent or by exposure to actinic radiation, such as ultraviolet, electron beam, microwave, visible, infrared, or gamma radiation.

One or more additives are optionally included for modifying the properties of the protein-polymer composite material and/or the admixture of organic solvent and polymer resin, the aqueous protein solution, the emulsion, and/or the curable composition. Illustrative examples of such additives include a light stabilizer such as a UV absorber or radical scavenger, a plasticizer, a wetting agent, a preservative, a surfactant, a lubricant, a pigment, a filler, and an additive to increase sag resistance.

Light stabilizers include UV absorbers and radical scavengers. A UV absorber absorbs UV light changing the energy to heat that is dissipated through the material. Illustrative examples of UV absorbers include a benzophenone, a benzotriazole, a hydrozyphenyltriazine, an oxalic anilide, a yellow iron oxide, or a combination thereof. Additional examples of UV absorbers are found in U.S. Pat. No. 5,559,163, the contents of which are incorporated herein by reference. The inventors discovered that benzotriazoles generally demonstrate the most effective range of UV wavelength absorption, and converts the absorbed UV light into heat. Some embodiments of the invention include the UV absorber TINUVIN 384-2 that is a mixture of C7-9 ester of [3-2h-benzotriazol-2-yl)-5-(1,1-dimethylethyl)-4-hydroxyphenyl)]-propionic acid (herein tinuvin 384-2) with the structure:

(I)

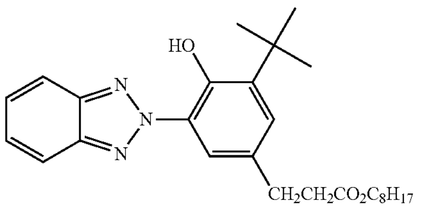

TINUVIN 1130 (methyl 3-[3-(benzotriazol-2-yl)-5-tert-butyl-4-hydroxyphenyl]propanoate) (herein tinuvin 1130) with the structure:

(II)

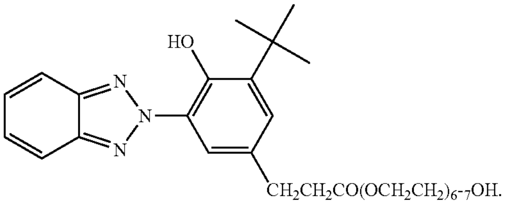

or UV416 (2-(4-Benzoyl-3-hydroxyphenoxy)ethyl acrylate) (herein UV416) with the structure:

(III)

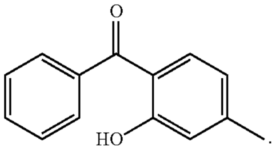

A radical scavenger light stabilizer (e.g., a sterically hindered amine light scavenger (HALS)) chemically reacts with a free radical. Examples of a HALS include the ester derivatives of a decanedioic acid, such as a HALS I [bis(1,2,2,6,6,-pentamethyl-4-poperidinyl)ester], which may be used in a non-acid catalyzed coating; and/or a HALS II [bis(2,2,6,6,-tetramethyl-1-isooctyloxy-4-piperidinyl)ester], which may be used in an acid catalyzed coating.

The inventors made two unexpected discoveries limiting the choices of UV absorber or HALS operable in an inventive composition. First, not all UV absorbers are operable. UV absorbers have a wide variety of cutoff wavelengths—the wavelength whereby the UV absorber transmits less than 10% incident light or absorbs 90% of incident light. Typical cutoff wavelengths (wavelength with 10% transmission) must be in excess of 370 nm, optionally in excess of 380 nm, optionally up to 390 nm when present at the concentration in the material. The second important discovery is that functional UV absorbers require the presence of at least one HALS to protect enzyme activity in the protein-polymer composition. Neither of these requirements were recognized by prior investigators, particularly because they were concerned with UV stabilizing the polymeric structure itself failing to appreciate the requirements for stabilizing an enzyme contained in the polymeric structure. Stabilizing the polymeric structure does not equate with stabilizing the enzyme activity within the polymeric structure. This is seen in that the most common coatings and substrate polymeric materials incorporating light stabilizers used in the art are inoperable to stabilize enzymes due at least to the previously preferred concentrations of UV stabilizers below 4% by weight.

The inventors also unexpectedly discovered that the concentration (% final dry weight) of UV absorber effective to stabilize an enzyme in a protein-polymer coating or substrate is in excess of 5%, optionally between 5.001% and 15%, optionally from 6 to 10 percent, optionally from 7% to 9%, optionally 8%, or more, or any value or range therebetween. In some embodiments, a single or combination of UV absorbers are present to form a final total dry weight percent in excess of 5%, 6%, 7%, 8%, 9%, 10%, 11%, 12%, 13%, 14%, 15%, 18%, or more, or any value or range therebetween.

At least one HALS must be present in an inventive protein-polymer composition. The concentration of HALS is optionally between 0.01% and 3%, or any value or range therebetween. In some embodiments, the concentration of a HALS is 1% final dry weight.

A typical example of a 2K solvent borne (SB) polyurethane (PU) coating includes 1% of the HALS TINUVIN 152 (2,4-bis[N-Butyl-N-(1-cyclohexyloxy-2,2,6,6-tetramethylpiperidin-4-yl)amino]-6-(2-hydroxyeth ylamine)-1,3,5-triazine) (tinuvin 152) along with a UV absorber with a cutoff below 370 nm such as a hydroxypyenyl triazine in excess of 5% final dry weight.

Methods of preparing protein-polymer compositions are illustratively characterized by dispersion of protein in solvent-borne resin prior to curing, in contrast to forming large aggregates of the bioactive proteins which diminish the functionality of the protein and protein-polymer composite materials. Proteins are optionally dispersed in the protein-polymer composite material such that the proteins are unassociated with other proteins and/or form relatively small particles of associated proteins. Illustratively, the average particle size of amylase particles in the protein-polymer composite material is less than 10 μm (average diameter) such as in the range of 1 nm to 10 μm, including any value or range therebetween.

A process of forming a composition useful as a substrate or coating including a protein is illustratively indicated as in the flow diagram of FIG. 1. As indicated in FIG. 1, a protein-polymer composition may be formed by providing an admixture of a polymer resin, a surfactant, a non-aqueous organic solvent, and at least two light stabilizers including a sterically hindered amine and a UV absorber. The UV absorber is present in the admixture at sufficient amounts to yield a final composition that is at least 5% by weight of the UV absorber. The components of the admixture are mixed to, produce an emulsion. An aqueous solution substantially free of surfactant and containing isolated enzymes is mixed with the admixture to produce an emulsion. A crosslinker is then illustratively mixed with the emulsion to produce a curable composition. The curable composition may then be cured to form a protein-polymer composite material.

A polymer resin, or mixture of polymer resins, is present in amounts in the range of about 10-90 weight percent of the admixture of the polymer resin or polymer resins, solvent and surfactant. In embodiments of the present invention, a polymer resin, or mixture of polymer resins, is present in amounts in the range of about 20-60 weight percent of the admixture. A solvent used as a diluent of the polymer resin or resins is typically present in amounts in the range of about 1-50 weight percent of the admixture. In embodiments of the present invention, a solvent used as a diluent of the polymer resin or resins is present in amounts in the range of about 2-30 weight percent of the admixture. A surfactant is typically present in amounts in the range of about 0.1-5 weight percent of the admixture. In embodiments of the present invention, a solvent used as a diluent of the polymer resin or resins is present in amounts in the range of about 0.2-4 weight percent of the admixture.

The term "surfactant" refers to a surface active agent that reduces the surface tension of a liquid in which it is dissolved, or that reduces interfacial tension between two liquids or between a liquid and a solid. Surfactants used can be of any variety including amphoteric, silicone-based, fluorosurfactants, anionic, cationic and nonionic such as described in K. R. Lange, Surfactants: A Practical Handbook, Hanser Gardner Publications, 1999; and R. M. Hill, Silicone Surfactants, CRC Press, 1999, incorporated herein by reference. Examples of anionic surfactants illustratively include alkyl sulfonates, alkylaryl sulfonates, alkyl sulfates, alkyl and alkylaryl disulfonates, sulfonated fatty acids, sulfates of hydroxyalkanols, sulfosuccinic acid esters, sulfates and sulfonates of polyethoxylated alkanols and alkylphenols. Examples of cationic surfactants include quaternary surfactants and amineoxides. Examples of nonionic surfactants include alkoxylates, alkanolamides, fatty acid esters of sorbitol or manitol, and alkyl glucamides. Examples of silicone-based surfactants include siloxane polyoxyalkylene copolymers.

In some embodiments, no surfactant is intentionally added to the aqueous bioactive protein solution and the aqueous bioactive protein solution is substantially free of surfactant. The term "substantially free" refers to the total absence or near-total absence of surfactant in the aqueous bioactive protein solution.

In particular embodiments, a non-aqueous organic solvent having a log P in the range of −0.5 to 2, or any value or range therebetween, is used. In embodiments of the present invention, a non-aqueous organic solvent having a log P in the range of −0.5 to −2, or any value or range therebetween, is used as a diluent for a polymer resin, for example, to adjust the viscosity of the polymer resin.

The term "log P" refers to the partition coefficient of a substance. The log P of a substance is the base ten logarithm of the ratio of solubility of the substance in n-octanol to solubility of the substance in water. Log P values for many organic solvents are known, for example as described in Leo A, Hansch C, and Elkins D (1971). "Partition coefficients and their uses". *Chem Rev* 71 (6): 525-616. Log P values can also be calculated as described, for example, in Sangster, James (1997). *Octanol-Water Partition Coefficients: Fundamentals and Physical Chemistry, Vol.* 2 *of Wiley Series in Solution Chemistry*. Chichester: John Wiley & Sons Ltd.

Table 1 shows correlation of log P values with retention of incorporated protein activity and polyacrylate polyol resin compatibility.

TABLE 1

Solvent compatibility with polyacrylate polyol polymer resins, enzyme activity and stability

| Solvent | Log P | Compatible with resins | Initial specific activity ($Unit/cm^2$) | Half life of coating incubated at 103° C. (hours)* |
|---|---|---|---|---|
| Acetone | −0.23 | Yes | 1.75 | 30 |
| Methyl ethyl ketone | 0.29 | Yes | 1.48 | 59 |
| Ethyl acetate | 0.7 | Yes | 1.32 | 75 |
| Methyl isobutyl ketone | 1.31 | Yes | 1.40 | 93 |
| Butyl acetate | 1.7 | Yes | 1.70 | 154 |
| Toluene | 2.5 | Yes | 1.56 | 14 |
| Hexane | 3.5 | No | N/A | N/A |
| Isooctane | 4.5 | No | N/A | N/A |

*Coatings were cured by exposure to 80° C. for 30 minutes and then room temperature for one week before incubation in an oven at 103° C. to evaluate stability of the enzyme in the protein-polymer composite materials.

This relationship shows that bioactive proteins incorporated into solvent-borne protein-polymer composite materials had a similar initial specific activity within a broad range of solvents. However, in terms of stability, solvents having log P values in range of −0.5-2, inclusive, are used in processes described herein and allow for protein incorporation into solvent-borne coatings with optimum protein stability as shown by half-life times at 103° C. Solvents with log P 3.5 and higher, such as hexane and isooctane, are not compatible with the polyacrylate polyol resins used in embodiments of processes of making two component solvent-borne (2K SB) polymer-protein composites of the present invention.

While some embodiments include use of a non-aqueous organic solvent having a log P in the range of −0.5-2, inclusive, solvents having a lower or higher log P could also be used if they are compatible with resins and bioactive proteins.

Non-limiting examples of solvents having log P values ranging from −0.5 to 2, inclusive, include methyl ethyl ketone (0.29), ethyl acetate (0.7), methyl isobutyl ketone (1.31), butyl acetate (1.7) and other solvents listed in Table 2.

A non-aqueous organic solvent having a log P in the range of −0.5-2 inclusive, can be any such solvent compatible with polymer resins and not substantially reactive with a selected crosslinker to be used in a process of the present invention. Examples of non-aqueous organic solvents incompatible with polyacrylate polyol polymer resins and polyisocyanate crosslinkers are aliphatic hydrocarbons and non-aqueous organic solvents having hydroxyl and/or amino groups. Thus, in some embodiments, aliphatic hydrocarbon non-aqueous organic solvents and non-aqueous organic solvents having hydroxyl and/or amino groups are excluded as not compatible with polymer resins used in inventive processes.

TABLE 2

Solvents having log P values in the range of −0.5-2

| Solvent | Log P |
|---|---|
| acetone | −0.23 |
| butanone | 0.29 |
| ethyl acetate | 0.68 |
| pentanone | 0.8 |
| cyclohexanone | 0.96 |
| methyl propionate | 0.97 |
| propylacetate | 1.2 |
| ethyl chloride | 1.3 |

TABLE 2-continued

| Solvents having log P values in the range of −0.5-2 | |
|---|---|
| Solvent | Log P |
| hexanone | 1.3 |
| methyl cyclohexanone | 1.5 |
| benzyl acetate | 1.6 |
| butyl acetate | 1.7 |

Curable protein-polymer compositions according to embodiments of the present invention include two-component solvent-borne (2K SB) compositions optionally where the two components are mixed shortly before use, for instance, application of the curable protein-polymer composition to a substrate to form a bioactive coating such as a bioactive clear coat. Generally described, the first component contains a crosslinkable polymer resin along with an enzyme and at least two light stabilizers, and the second component contains a crosslinker.

Typically, the coating is applied to produce a coating having a thickness in the range of about 1-500 microns when dry, although coatings thicker or thinner can be used depending on the desired use.

Application of the curable composition is accomplished by any of various methods illustratively including spray coating, dip coating, flow coating, roller coating and brush coating.

A substrate is any of various substrates to which a coating is advantageously applied. For example, a substrate is a sheet material. In a further example, a substrate is a vehicle part, such as a vehicle body panel, a cooking surface, clothing, thread material, or other desired material.

Substrates for use according to the present invention include, but are not limited to, metal substrates, silica, substrates, plastic substrates such as polyester substrates, cotton substrates, and glass substrates, or substrates incorporating combinations thereof.

A substrate optionally includes a coating such as a primer, a primer-surfacer, a primer-sealer, a basecoat, an adhesion promoting layer, or a combination of any of these or other surface treatment coatings.

Coatings of protein-polymer material according to embodiments of the present invention provide good adhesion to substrates, protection against environmental insults, protection against corrosion, and further provide active properties of the protein. Thus, in certain embodiments, coatings of protein-polymer material provide enzyme activity on a substrate useful in numerous applications such as detection of an analyte which is a substrate for the enzyme or a ligand for a receptor, antibody or lectin. In particular embodiments, coatings provide resistance against staining by enzyme digestion of one or more components of stain producing material.

When a protein-polymer composition is contacted with biological material to produce a biological stain, the enzyme or combinations of enzymes contact the stain, or components thereof. The contacting allows the enzymatic activity of the protein to interact with and enzymatically alter the components of the stain improving its removal from the substrate or coating.

Proteins are included in compositions according to embodiments of the present invention in amounts ranging from 0.1-50% weight percent of the total weight of the material composition.

Enzyme containing substrates or coatings have a surface activity generally expressed in Units/cm$^2$. Substrates and coatings including a thermolysin such as Thermoase-160 optionally have functional surface activities prior to weathering of greater than 0.0075 Units/cm$^2$. In some embodiments surface activity is between 0.0075 Units/cm$^2$ and 0.05 Units/cm$^2$ inclusive. Optionally, surface activity is between 0.0075 Units/cm$^2$ and 0.1 Units/cm$^2$ inclusive. Optionally, surface activity is between 0.01 Units/cm$^2$ and 0.05 Units/cm$^2$ inclusive. In coatings containing α-amylase from *Bacillis subtilis* typical surface activities prior to weathering are at or in excess of 0.1 Units/cm$^2$. In some embodiments surface activity is between 0.01 Units/cm$^2$ and 1.5 Units/cm$^2$. Optionally, surface activity is between 0.01 Units/cm$^2$ and 2.5 Units/cm$^2$. Optionally, surface activity is between 0.01 Units/cm$^2$ and 3.0 Units/cm$^2$. Any value or range of surface activities at or between 0.1 Units/cm$^2$ and 3.0 Units/cm$^2$ is operable herein. It is appreciated that higher surface activities are achievable by increasing the enzyme concentration, using enzyme with a higher specific activity such as an analogue of a wild-type enzyme, or by otherwise stabilizing enzyme activity during association with a polymer.

It is appreciated that the inventive methods of facilitating stain removal will function at any temperature whereby the protein is active. Optionally, the inventive process is performed at 4° C. Optionally, an inventive process is performed at 25° C. Optionally, an inventive process is performed at ambient temperature. It is appreciated that the inventive process is optionally performed from 4° C. to 125° C., or any single temperature or range therein.

The presence of protein combined with the material of a substrate or a coating on a substrate, optionally, with water or other fluidic rinsing agent, breaks down stains for facilitated removal.

Methods involving conventional biological techniques are described herein. Such techniques are generally known in the art and are described in detail in methodology treatises such as Molecular Cloning: A Laboratory Manual, 2nd ed., vol. 1-3, ed. Sambrook et al., Cold Spring Harbor Laboratory Press, Cold Spring Harbor, N.Y., 1989; and Current Protocols in Molecular Biology, ed. Ausubel et al., Greene Publishing and Wiley-Interscience, New York, 1992 (with periodic updates).

Various aspects of the present invention are illustrated by the following non-limiting examples. The examples are for illustrative purposes and are not a limitation on any practice of the present invention. It will be understood that variations and modifications can be made without departing from the spirit and scope of the invention.

EXAMPLE 1

Preparation of Enzyme-Based Polyurethane Coatings

Materials: α-Amylase, Lipase PS, Protease N, Protease A, Protin SD AY-10, *B. sterothermophilus* TLP (Thermoase C160), and Thermoase GL30 (low activity preparation of *B. sterothermophilus* TLP) are obtained from AMANO Enzyme Inc. (Nagoya, JAPAN). Polyacrylate resin Desmophen A870 BA, and the crosslinker hexamethylene diisocyanate (HDI) based polyfunctional aliphatic polyisocyanate resin Desmodur N 3600 are obtained from Bayer Corp. (Pittsburgh, Pa.). The surfactant BYK-333 is obtained from BYK-Chemie (Wallingford, Conn.). 1-butanol and 1-butyl acetate are obtained from Sigma-Aldrich Co. (Missouri, USA). Aluminum paint testing panels are purchased from Q-Lab Co. (Cleveland, USA). All other reagents involved in the experiments are of analytical grade. Edge filters with visible long wave pass are obtained from Andover Co. (Salem, N.H.). UV absorbers Tinuvin 400, 328, 384-2, 928, 1150, and Hindered Amine Light Stabilizer (HALS) Tinuvin 152 are obtained from BASF Co. (Florham Park, N.J.). UV absorber 416 is purchased from Pharnorcia Inc. (Edison, N.J.). It is appreciated that one of ordinary skill in the art readily recognizes that the name Tinuvin followed by a number not only indicates a source, but also indicates a specific chemical composition. As such, the use of the name Tinuvin followed by a number is recognized by one of ordinary skill in the art as a specific compound independent of a source from which the compound may be obtained.

Enzyme based 2K SB PU coatings are prepared by either a draw-down method or by spray application and used for subsequent testing of enzyme activity. Each enzyme is dissolved in DI water to a final enzyme solution concentration of 50 mg/mL for all water borne (WB) coatings. For solvent borne (SB) enzyme prepared coatings 200 mg/mL enzyme is used except that α-amylase coatings are prepared with a 200 mg/mL solution of enzyme. When used, a solution of 150 ml of deionized water containing 1.5 g *B. sterothermophilus* TLP is first purified by ultrafiltration (molecular weight cut-off of 30 kDa, all liquids were kept on ice). When used, the enzyme α-amylase is first purified by first preparing a 150 mL solution containing α-amylase raw powder (6.75 g) in DI water. The insoluble large impurity in raw powder is removed by filtration over a 200 nm PTFE filter. The filtered solution has a protein concentration around 20 mg/mL (measured by the Bradford method) and is maintained on ice. Ultrafiltration is performed using a 300 mL Amicon cell (cooled with ice) with a pressure of 55 psi and an ultrafiltration membrane with a cut-off of 30 kDa obtained from Millipore (Billerica, Mass.) to remove small impurities. Ultrafiltration is repeated 3 times by refilling the cell back to 300 mL after each run. Then the final remaining purified protein solution is used for coating preparation.

For the draw-down method of coating preparation, the surfactant BYK 333 is diluted with 1-butanol to the concentration of 17% by weight. The resin part of the 2K SB PU coating is prepared by mixing 2.1 g of Desmophen A 870, optional two light stabilizers in 0.5 mL of 1-butyl acetate, and 0.1 mL surfactant in a 20 mL glass vial. The UVAs and HALS are dissolved in 1-butyl acetate to a concentration of 200 mg/ml prior to mixing with resin solution. When light stabilizers are added, each composition is made with the HALS TINUVIN 152 at 1% final dry weight and varying concentrations between 1% and 18% final dry weight of the UV absorbers depicted in FIG. 4. The solution is mixed using a microspatula for 1 min followed by addition of 0.6 mL of enzyme solution (or DI water for control coating without enzyme) followed by mixing for another 1 min. This solution is then poured out into a 20-mL glass vial with 0.8 g of Desmodur N3600 and stirred for 1 min. This formulation produces an enzyme concentration of 5% by weight. Precleaned aluminum testing panels are coated with the enzyme containing coating material using a draw-down applicator with a wet film thickness of 2 mils. The coating panels are baked at 80° C. for 30 minutes and then cured at room temperature for 7 days.

EXAMPLE 2

Wavelength Specific Enzyme Inactivation in Protein-Polymer Coatings

The coatings of Example 1 are applied to aluminum testing panels by the draw-down method of Example 1. The testing panels are subjected to different wavelength light by covering the coating with a long-wave-pass (LWP) filter. Several filters are used with a 50% transmission cut-off at 200, 283, 400, 500, or 600 nm. This divides the full spectrum of incoming light into several test wavelength range categories: 200-283 nm, 283-400 nm, 400-500 nm, and 500-600 nm and >600 nm. To specifically identify contribution of UV-light absent light from the visual spectrum, a test panel is covered with a filter having a 25% transmission peak at 350 nm and with an 80 nm bandpass. The test panels are subjected to light irradiation using a xenon lamp. The xenon lamp provides for a system that allows exposure to both heat and UV light whereby the light from the lamp closely mimics sunlight. The panels are placed in a weathering chamber so that some panels are exposed to heat, moisture, and/or light including light in the UV range. Differing conditions are simultaneously tested essentially as in Table 3:

TABLE 3

Weathering conditions.

| Coating Sample Orientation | Exposure Level: Heat | Exposure Level: Moisture | Exposure Level: Light |
|---|---|---|---|
| I. Facing the lamp | Strong | Strong | Strong |
| II. Rear facing the lamp | Strong | Strong | Weak |
| III. Rear facing with opaque cover | Strong | Weak | None |
| IV. Rear facing with sealed opaque cover | Strong | None | None |
| V. Facing lamp with sealed quartz cover | Strong | None | Strong |

The test panels are subjected to 24 weathering cycles of two hours each. The lamp remains on for the entire test period emitting UV light in the wavelength range of 300-400 nm at 106 W/m$^2$. Each cycle includes 18 minutes of water spray. The test panels are each heated to 70° C. At the end of each test a control sample (not subjected to weathering) and test panels are analyzed for enzyme activity.

Test panels coated with α-amylase containing coatings are assayed by determination of amydolytic activity by reacting test panels with the α-amylase substrate 1% w/v potato starch in 20 mM sodium phosphate buffer with 6.7 mM sodium chloride (pH 6.9). The substrate solution (2 mL) is added to one rectangular piece of the coated test panel (1.2 cm×1.9 cm) and incubated for 3 min at 25° C. The equivalent amount of reducing sugar produced is determined using a UV-VIS spectrometer (Cary 300-Varian Inc., Walnut Creek, Calif., USA) at 540 nm. One unit of α-amylase activity is defined as 1.0 mg of reducing sugar (calculated from a standard curve previously calibrated against maltose) released from starch in 3 min at room temperature. To evaluate the activity of enzyme embedded inside the coating, the coating surface is pretreated by fine-grained sandpaper (600 grit) six times under moderate grinding pressure (approx. 0.5 N). After abrasion, the recovered activity is determined by enzyme assay as for the surface enzyme.

Coatings prepared with thermolysin are assayed for proteolytic surface activity or embedded enzyme activity essentially following the method of Folin and Ciocalteau, *J. Biol. Chem.,* 1927; 73: 627-50, incorporated herein by reference. Briefly, 1 mL of 2% (w/v) casein in sodium phosphate (0.05 M; pH 7.5) buffer solution is used as substrate together with 200 μl of sodium acetate, 5 mM calcium acetate (10 mM; pH 7.5). The substrate solution is pre-incubated in a water bath for 3 min to reach 37° C. The reaction is started by adding one piece of sample plate coated with *B. sterothermophilus* TLP based coating (1.2×1.9 cm) followed by shaking for 10 min at 200 rpm at which time the reaction is stopped by adding 1 ml of 110 mM tricholoroacetic acid (TCA) solution. The mixture is incubated for 30 min at 37° C. prior to centrifugation. The equivalent of tyrosine in 400 μL of the TCA-soluble fraction is determined at 660 nm using 200 μL of 25% (v/v) Folin-Ciocalteau reagent and 1 mL 0.5 M sodium carbonate. One unit of activity is defined as the amount of enzyme hydrolyzing casein to produce absorbance equivalent to 1.0 mmol of tyrosine per minute at 37° C. This result is converted to Units/$cm^2$.

Figure 2:
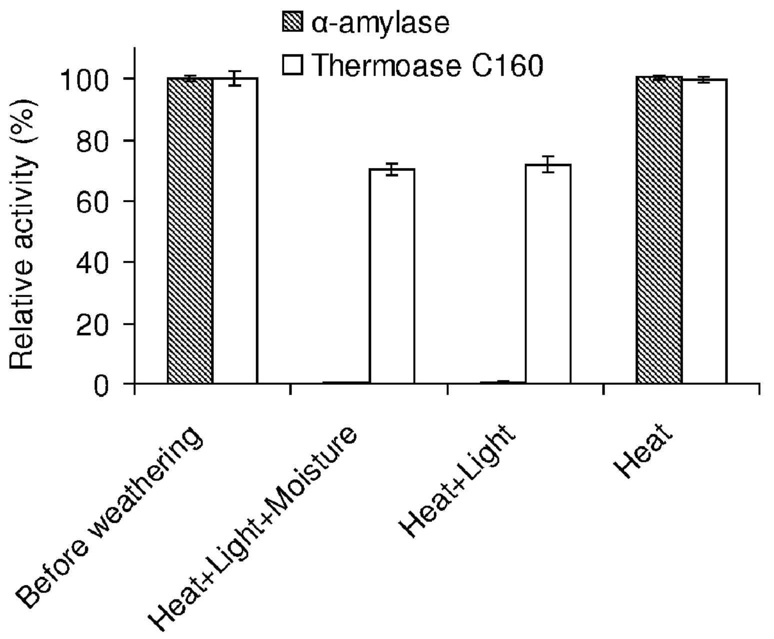
FIG. 2 illustrates the activity of a thermolysin and α-amylase in a protein-polymer coating before and after the coating is subjected to various levels and types of weathering.

As depicted in FIG. 2, exposure to heat, light, and moisture for the testing period results in zero detectable α-amylase activity with 70% of thermolysin activity remaining. Exposure to heat and light alone is not as destructive with over 70% of thermolysin activity remaining, but with almost zero detectable of α-amylase activity. Both enzymes are stable under heating alone. Overall, these data indicate that coatings exposed to UV light show reduced enzyme activity.

Figure 3:
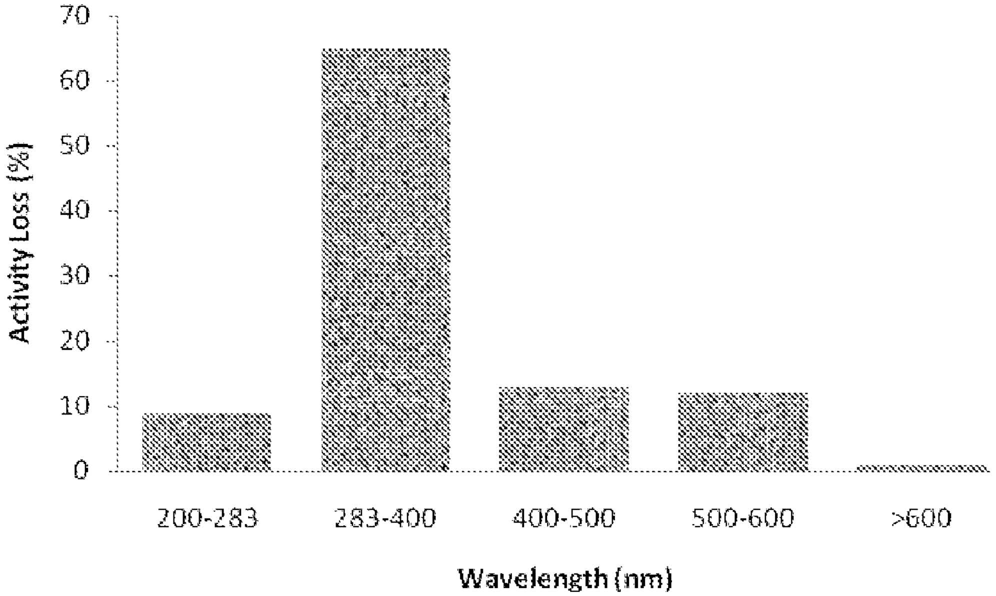
FIG. 3 illustrates the wavelength dependent enzyme sensitivity of protein-polymer compositions.

The same weathering tests are performed using test panels covered with the LWP cutoff filters. FIG. 3 illustrates that UV wavelengths from 283 to 400 are most responsible for the activity loss. The α-amylase activity subjected only to far UV light (200-283 nm) demonstrates only 9% loss in enzyme activity. Exposure to UV light in the near UV region, in contrast, results in 65% activity loss. Visible wavelengths (i.e. >400 nm) produce 13% or lower reduction in enzyme activity. Thus, UV light in the near UV is the most damaging to enzymes in inventive coatings.

EXAMPLE 3

Determination of Ideal UV Absorbers for Protection of Enzyme

Figure 4:
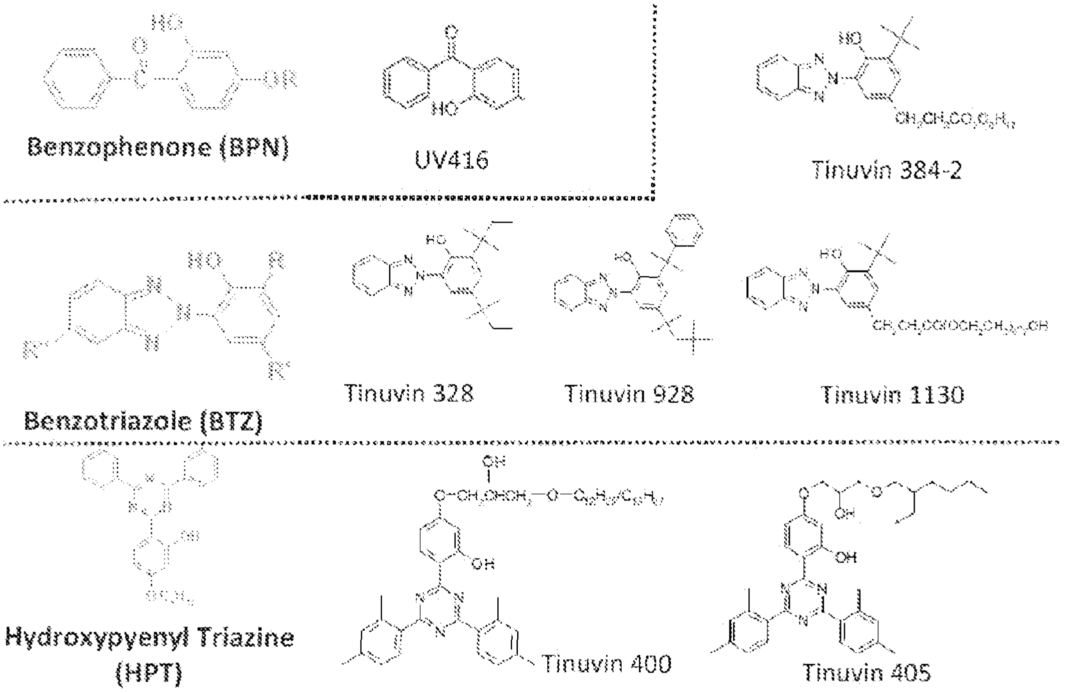
FIG. 4 illustrates the chemical structures of several light stabilizers used in embodiments of the invention.
Figure 5A:
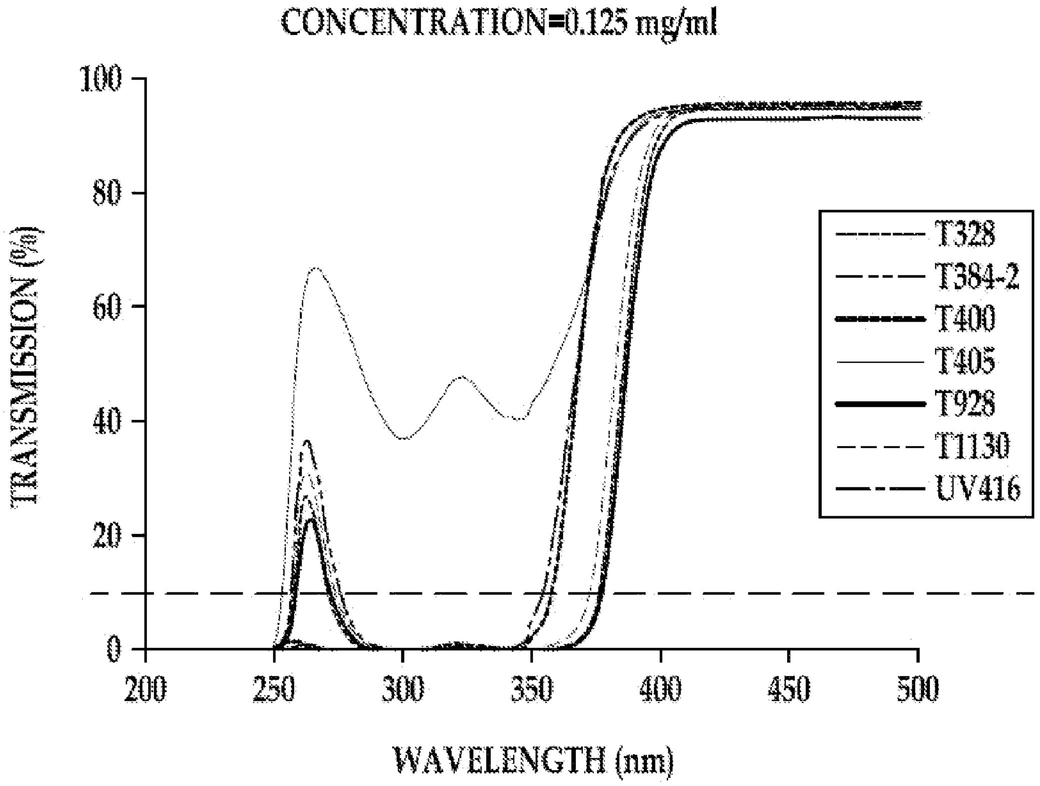
FIG. 5 illustrates the transmission spectra of several UV absorbers at several concentrations.
Figure 5B:
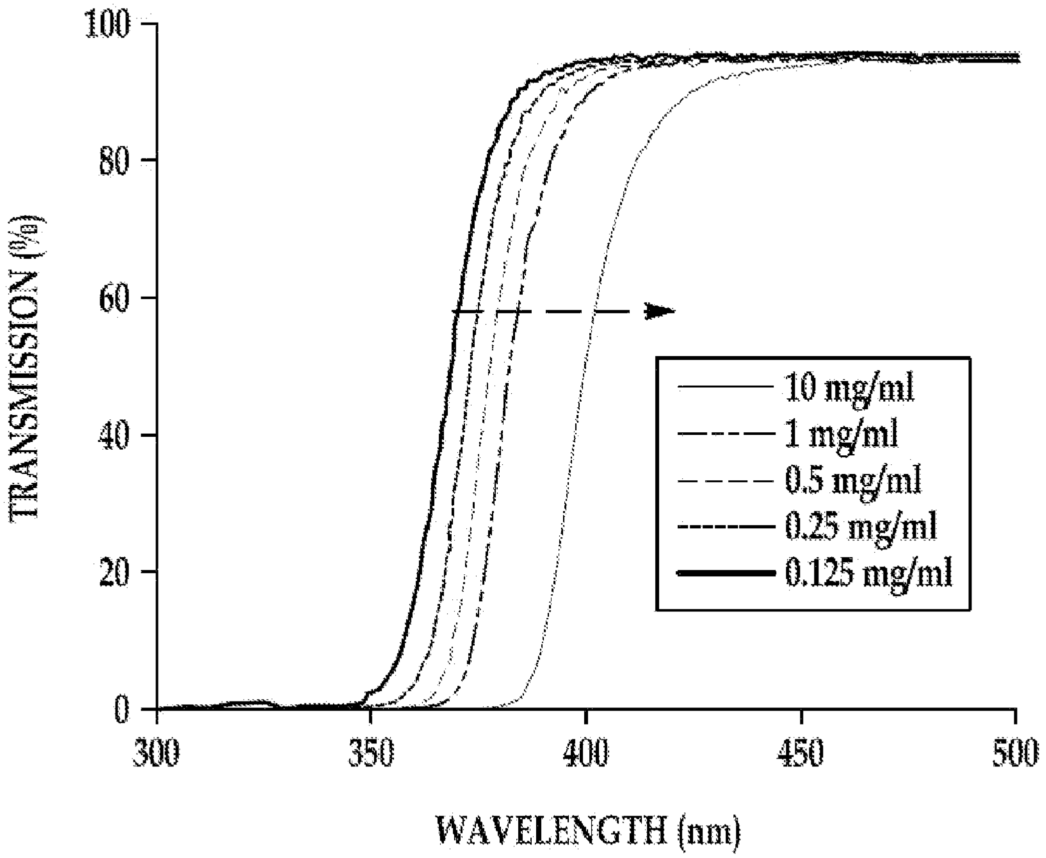

Many different UV absorbers (UVA) are known in the art. A selection of UV absorbers are tested for their ability to block UV light within the desired wavelength range of 280 nm to 400 nm as determined to be the region of enzyme sensitivity in Example 2. The UV absorbers of FIG. 4 are dissolved in butyl acetate at a final concentration of 0.125 mg/ml, which corresponds to a 2% NV loading concentration when added to a 30 μm thick film of protein-polymer composition of Example 1. The dissolved UV absorbers are placed in a quartz cell with a 1 cm light path and analyzed on a scanning spectrophotometer for UV transmission. Each of the UV absorbers tested has a similar pattern of wavelength rejection described by a sharp decrease in UV transmission within the range from 350-400 nm. (FIG. 5) The cut-off values (10% transmission) for each of the tested UVAs is illustrated in FIG. 5A.

Different concentrations of the UVAs are also examined to determine if the concentration of UVA will alter the absorption capabilities of the materials. Each of the UVAs is dissolved in butyl acetate at concentrations ranging from 0 mg/ml to 1 mg/ml corresponding to the final percent amounts when added to a 30 μM thick film of protein-polymer composition of Example 1. Table 4 illustrates these representative concentrations.

TABLE 4

| Coating | 0% NV | 1% NV | 2% NV | 4% NV | 8% NV |
|---|---|---|---|---|---|
| Solution | 0 mg/ml | 0.125 mg/ml | 0.25 mg/ml | 0.5 mg/ml | 1 mg/ml |

Figure 5C:
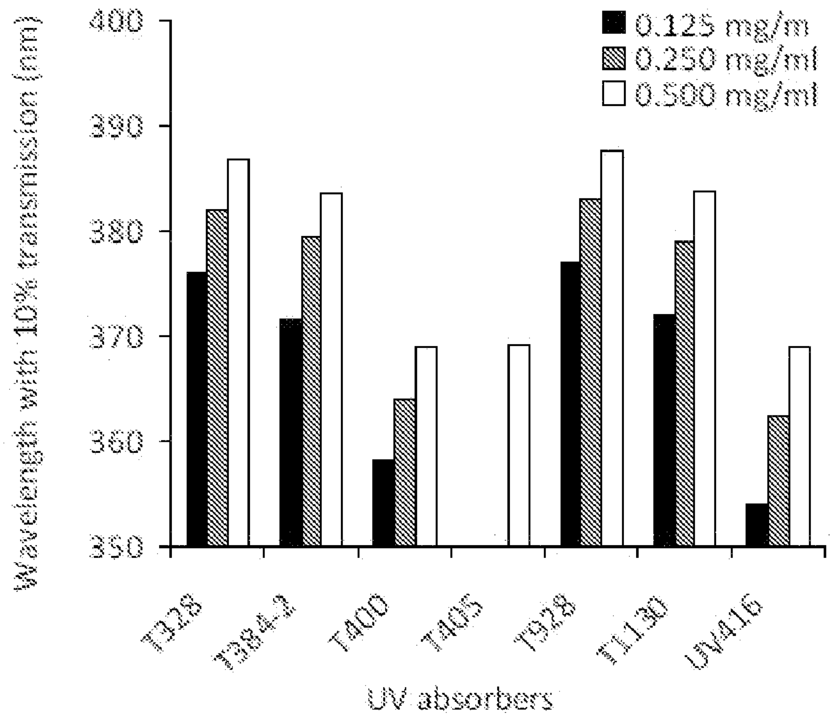
Figure 5D:
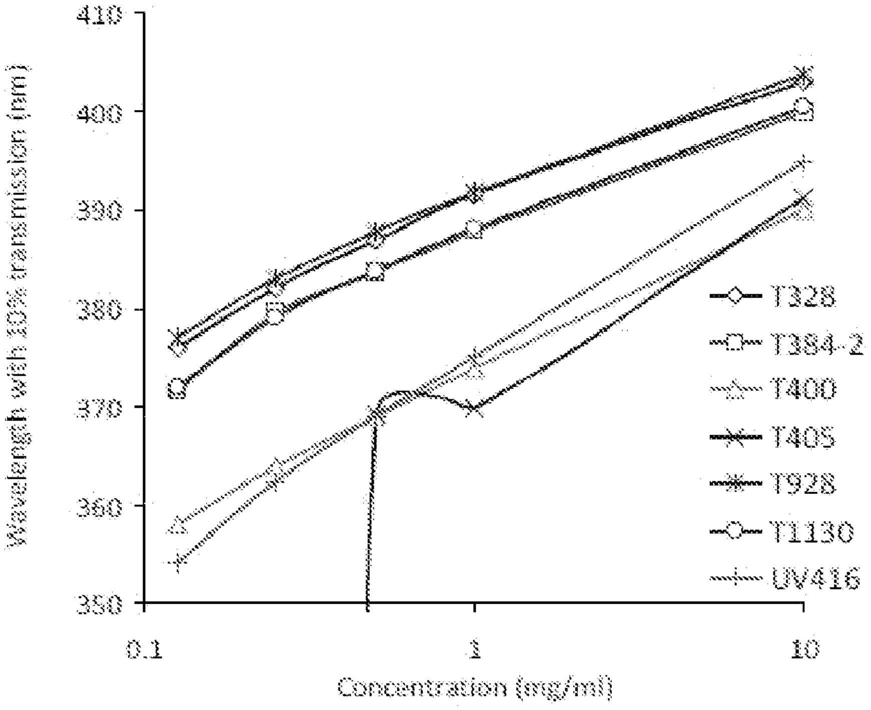

As illustrated in FIG. 58 using Tinuvin 400 as an example, and FIG. 5C as a summary of the concentration dependence of the cut-off value (10% transmission) several tested UVAs, the magnitude of UV extinction is dependent on concentration. At higher concentrations each of the UVAs tested has a higher extinction (right shift) and correspondingly higher cut-off wavelength. (FIG. 5C) The right shift is more significant at lower concentrations of UVA. (FIG. 5D) Determining the slope of cut-off value against concentration in FIG. 5D for each all the UVAs illustrates the concentration sensitivity as seen in Table 5.

TABLE 5

| | UV Absorber | | | | | | |
|---|---|---|---|---|---|---|---|
| | T328 | T384-2 | T400 | T405 | T928 | T1130 | UV416 |
| Slope | 2.1 | 2.1 | 2.6 | N/A | 2.1 | 2.2 | 3.2 |

UV416 has the largest slope (3.2) translating to the highest sensitivity of concentration variation, followed by T400 (2.6). UVAs from the BTZ group (FIG. 4) have similar slope values.

EXAMPLES 4-26

Addition of UV Absorber Protects Enzyme Activity in Protein-Polymer Coatings Several UV absorbers and HALS are tested for functionality in the two-part solvent borne coating formula of Example 1. The UVAs and HALS are dissolved in 1-butyl acetate to a concentration of 200 mg/ml prior to mixing with resin and enzyme solution. Each composition is made with the HALS TINUVIN 152 at 1% final dry weight and varying concentrations between 1% and 18% final dry weight of the UV absorbers depicted in FIG. 4. Each of the UV absorbers tested has a specific cut-off wavelength below which less than 10% of incident light is transmitted by the UV absorber.

Figure 6:
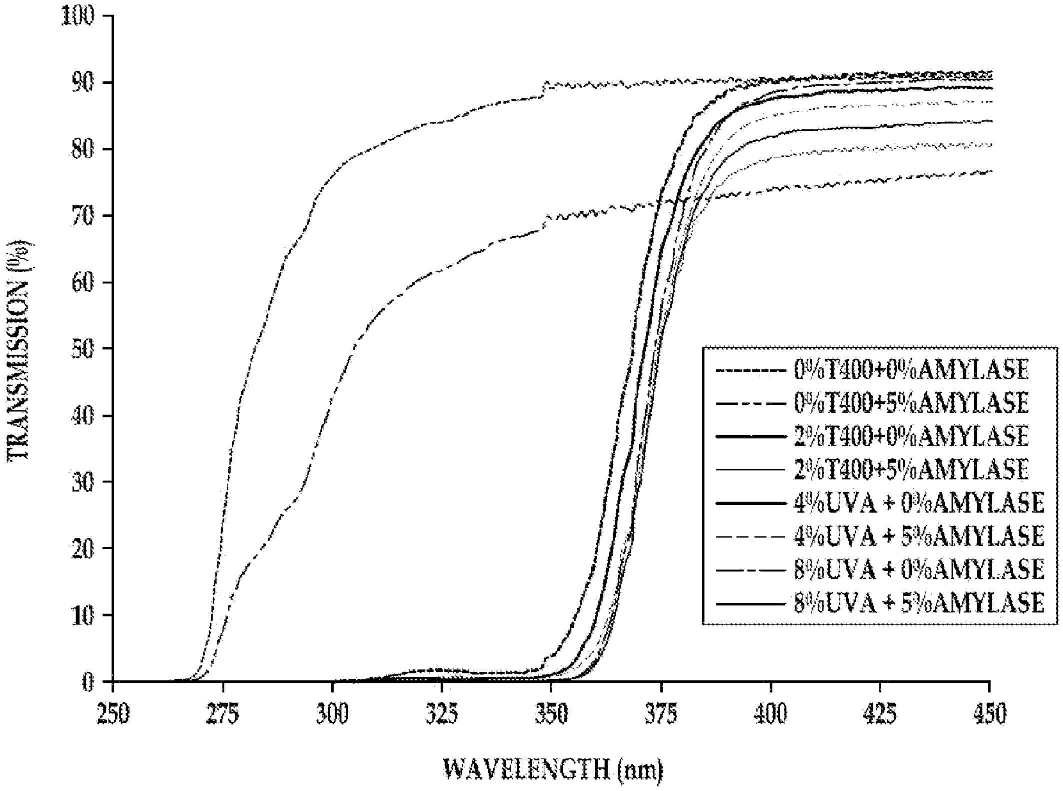
FIG. 6 illustrates the transmission spectra of tinuvin 400 at various concentrations in enzyme free or α-amylase containing polymeric coatings.

As illustrated in FIG. 6, in the absence of any UV additives or enzymes, the clear PU coating has a high transmission (90%) through the whole visible light region decreasing at 350 nm with a 50% cutoff at ~275 nm. The incorporation of UV additives does not change the transparency of the coating in the visible region. For each of the UVA containing coatings, a rapid decrease in transmission profile is observed in the UV range. As T400 is increased in loading concentration, the same right shift as is observed in solution is also observed in a coating leading to a right-shift of the cut-off wavelength. (FIG. 6)

The transmission profiles of coatings containing 8% final concentration by dry weight of T400 and T384-2 are compared with a 400 nm edge filter (control) between coatings with 5% α-amylase as seen in FIG. 6 depicting the 300 nm to 450 nm range. Coatings including 8% T384-2 has a 50% cut-off at 392 nm while it the 50% cutoff is 375 nm for 8% T400. (FIG. 7) Thus, the UVA T384-2 blocks more UV light that T400 when used in coatings under the same conditions. These data suggest that T384-2 is more effective to protect enzyme in protein-polymer coatings from the full spectrum of enzyme inactivating UV light.

Figure 7:
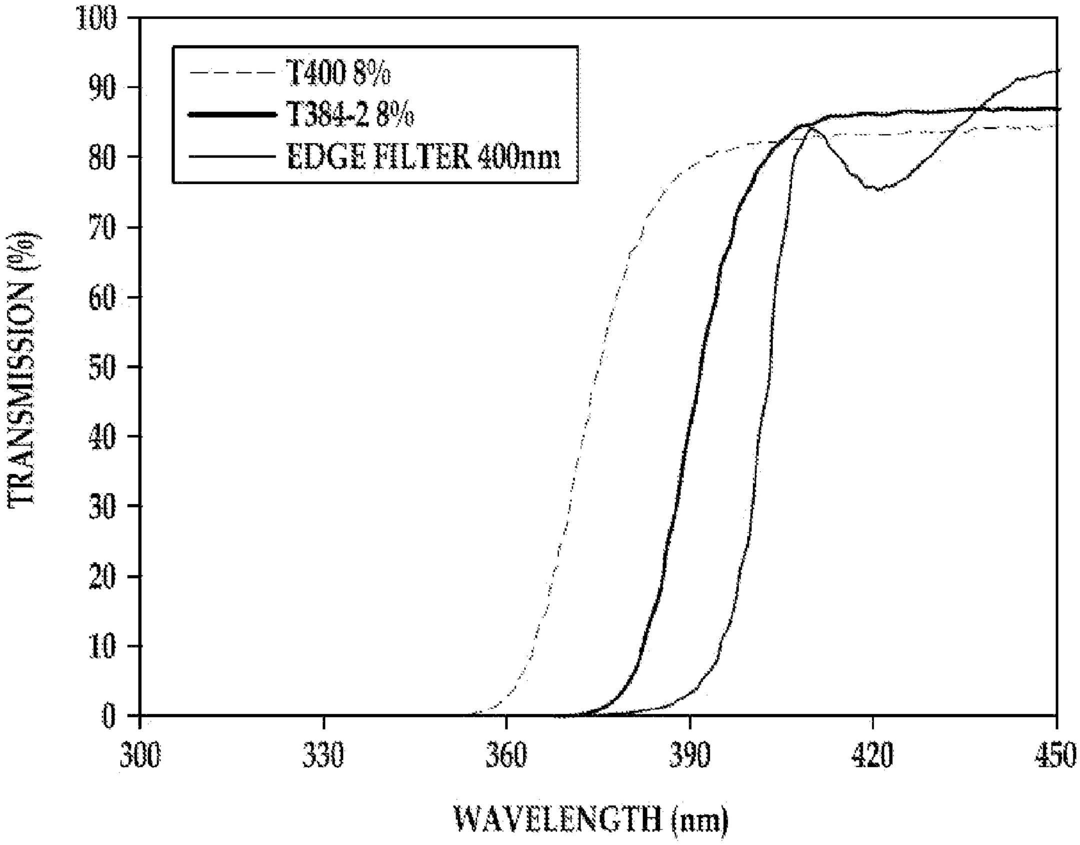
FIG. 7 illustrates the transmission spectra of two UV absorbers in protein-polymer compositions.
Figure 8:
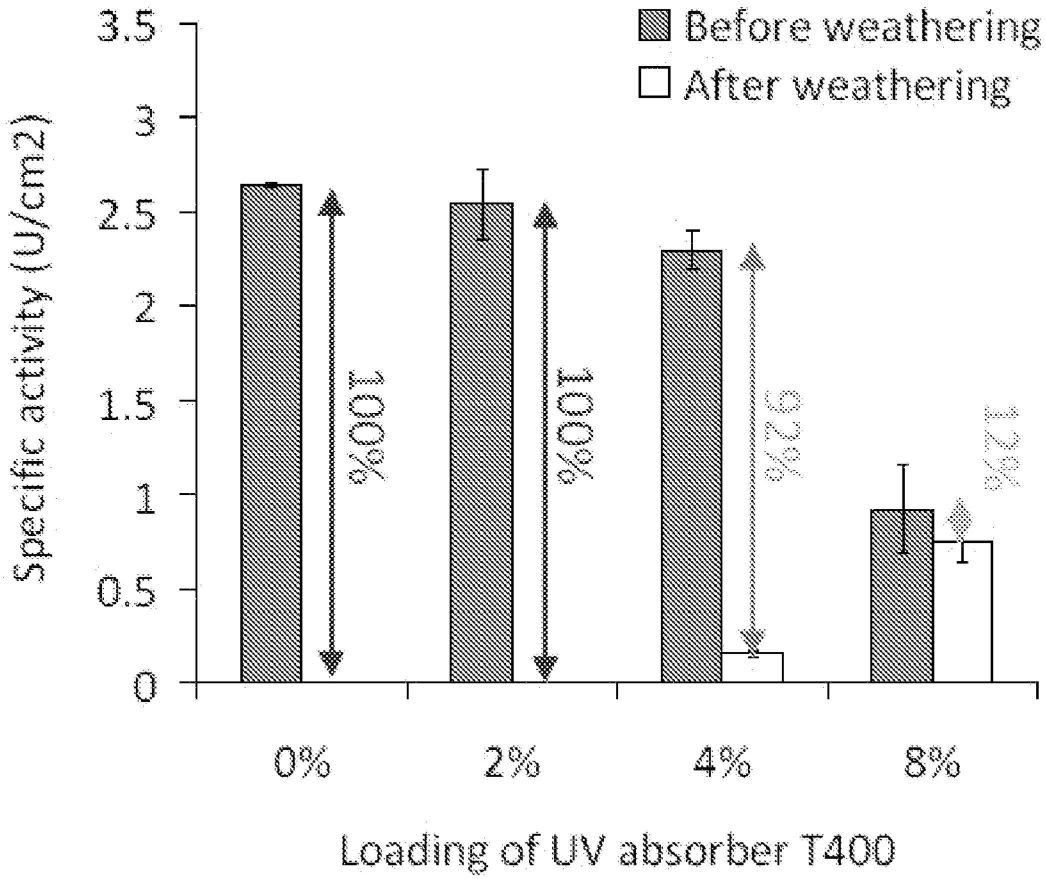
FIG. 8 illustrates the concentration dependence of a UV absorber on enzyme stabilization in a protein-polymer composition.
Figure 9:
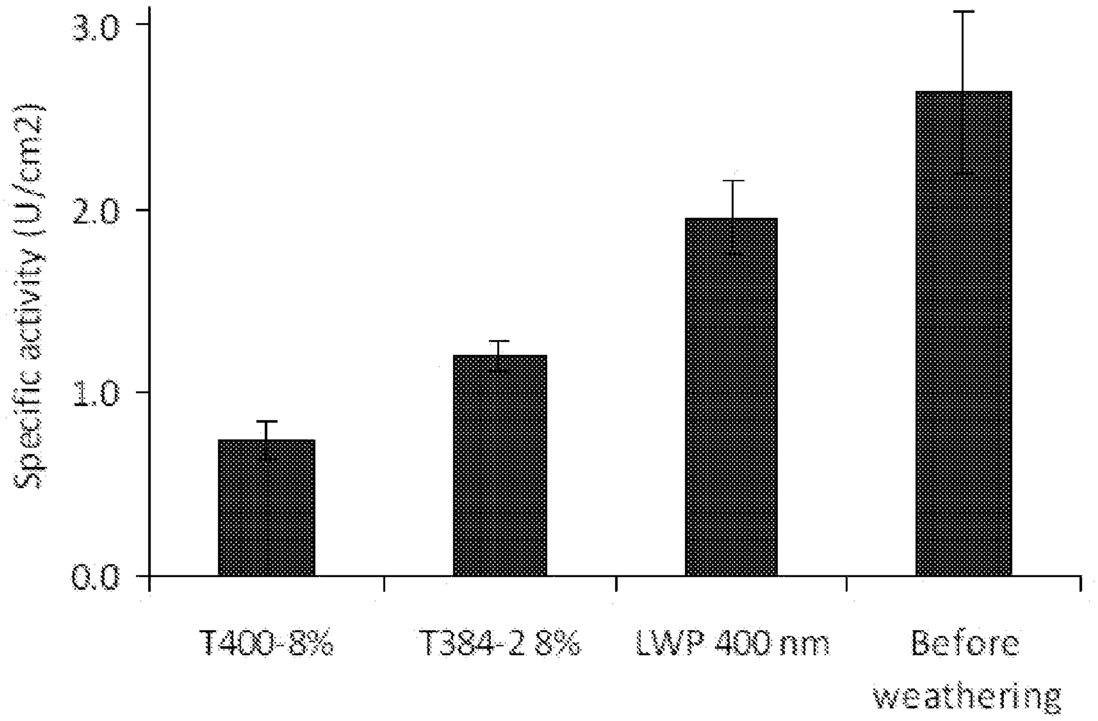
FIG. 9 illustrates the specific activity of protein-polymer compositions according to two embodiments of the invention before and after weathering.

The ability of each of the UVAs to protect enzyme activity is tested prior to and following weathering of the coatings performed as in Example 2. The initial and residual activities after 48 hours of weathering are compared as illustrated in FIG. 8. Enzyme in the coatings without or with low Tinuvin 400 loadings (e.g., 2%) are totally inactivated (100% activity loss) upon weathering with light exposure alone. UVA loadings of as 4% show 92% reducing in enzyme activity. However, at high loading concentrations of UVAs (8%), the majority of enzyme activity is retained (only 12% loss comparing with that before weathering). The T400 results are compared to T384-2, which has a higher wavelength cutoff as illustrated in FIG. 7. Enzyme incorporated in coatings including with T384-2 retains more activity than coatings including T400 indicating that UVAs with longer wavelength cut-off values are superior in protecting enzyme activity. (FIG. 9) Overall, these results demonstrate protection of enzyme activity during weathering when UV additives are added to protein-polymer coatings.

Various modifications of the present invention, in addition to those shown and described herein, will be apparent to those skilled in the art of the above description. Such modifications are also intended to fall within the scope of the appended claims.

It is appreciated that all reagents are obtainable by sources known in the art unless otherwise specified or synthesized by one of ordinary skill in the art without undue experimentation. Methods of nucleotide amplification, cell transfection, and protein expression and purification are similarly within the level of skill in the art.

Patents and publications mentioned in the specification are indicative of the levels of those skilled in the art to which the invention pertains. These patents and publications are incorporated herein by reference to the same extent as if each individual application or publication was specifically and individually incorporated herein by reference for the entirety of their teaching.

The foregoing description is illustrative of particular embodiments of the invention, but is not meant to be a limitation upon the practice thereof. The following claims, including all equivalents thereof, are intended to define the scope of the invention.

The invention claimed is:

1. A curable protein-polymer composition comprising:
a polymer resin;
a cross-linker;
a bioactive enzyme; and
at least two ultraviolet light stabilizers whereby at least one light stabilizer is a sterically hindered amine, and at least one light stabilizer is a UV absorber, said UV absorber present at a concentration in excess of 5% by weight.

2. The composition of claim 1, wherein the polymer resin is a hydroxyl-functionalized acrylate resin.

3. The composition of claim 1 wherein the crosslinker is a polyisocyanate.

4. The composition of claim 1 wherein said polymer resin and said cross-linker are covalently associated by a urethane bond.

5. A curable protein-polymer composition comprising:
a polymer resin;
a cross-linker;
a bioactive enzyme; and
at least two ultraviolet light stabilizers whereby at least one light stabilizer is a sterically hindered amine, and at least one light stabilizer is a UV absorber, said UV absorber present at a concentration in excess of 5% by weight, wherein said sterically hindered amine is 2,4-bis[N-Butyl-N-(1-cyclohexyloxy-2,2,6,6-tetramethylpiperidin-4-yl)amino]-6-(2-hydroxyethylamine)-1,3,5-triazine.

6. The composition of claim 1 wherein said sterically hindered amine is present at 1% by weight.

7. The composition of claim 1 wherein said UV absorber has a 10% cut-off at a wavelength at or in excess of 380 nm.

8. The composition of claim 1 wherein said UV absorber has a band reject of 10% transmission or less in the wavelength range from 280 nanometers to 380 nanometers.

9. The composition of claim 1 wherein said UV absorber is present at a concentration of 8% by weight or greater.

10. The composition of claim 5 wherein said UV absorber is: C7-9 ester of [3-2h-benzotriazol-2-yl)-5-(1,1-dimethylethyl)-4-hydroxyphenyl)]-propionic acid; 2-(2H-benzotriazol-2-yl)-4,6-ditertpentylphenol; 2-(1-methyl-1-phenylethyl)-4-(1,1,3,3-tetramethylbutyl)-6-(benzotriazol-2-yl) phenol; methyl 3-[3-(benzotriazol-2-yl)-5-tert-butyl-4-hydroxyphenyl]propanoate; or 2-(4-Benzoyl-3-hydroxyphenoxy)ethyl acrylate.

11. The composition of claim 10 wherein said polymer resin and said cross-linker are covalently associated by a urethane bond.

12. The composition of claim 10 wherein said UV absorber is present at a concentration of 8% by weight or greater.

13. A process for preparing a UV stabilized protein-polymer composite material, comprising:
providing an admixture of a polymer resin, a surfactant, a non-aqueous organic solvent, a sterically hindered amine, and a UV absorber, said UV absorber present at sufficient amounts to yield a final composition that is at least 5% by weight of said UV absorber;
mixing an aqueous solution containing isolated bioactive enzymes with the admixture, wherein said aqueous solution is substantially free of surfactant, to produce an emulsion;
and mixing the emulsion with a crosslinker to produce a curable UV stabilized protein-polymer composition.

14. The process of claim 13 further comprising curing the curable composition, thereby producing a cured UV stabilized protein-polymer composite material.

15. The process of claim 13 wherein said polymer resin is a hydroxyl-functionalized acrylate resin.

16. The process of claim 13 wherein said crosslinker is a polyisocyanate.

17. The process of claim 13 wherein said protein is an enzyme.

18. The process of claim 17 wherein said enzyme is α-amylase or an analogue thereof.

19. The process of claim 13 wherein said sterically hindered amine is 2,4-bis[N-Butyl-N-(1-cyclohexyloxy-2,2,6,6-tetramethylpiperidin-4-yl)amino]-6-(2-hydroxyethylamine)-1,3,5-triazine present at 1% by weight.

20. The process of claim 13 wherein said UV absorber has a 10% cut-off at a wavelength in excess of 380 nm.

21. The process of claim 13 wherein said UV absorber is: C7-9 ester of [3-2h-benzotriazol-2-yl)-5-(1,1-dimethylethyl)-4-hydroxyphenyl)]-propionic acid; 2-(2H-benzotriazol-2-yl)-4,6-ditertpentylphenol; 2-(1-methyl-1-phenylethyl)-4-(1,1,3,3-tetramethylbutyl)-6-(benzotriazol-2-yl) phenol; methyl 3-[3-(benzotriazol-2-yl)-5-tert-butyl-4-hydroxyphenyl]propanoate; or 2-(4-Benzoyl-3-hydroxyphenoxy)ethyl acrylate.

22. The process of claim 13 wherein said UV absorber is present at a final concentration of 8% by weight or greater.

23. A process of stabilizing enzyme activity in a protein-polymer curable composition against weathering from ultraviolet light comprising:
adding to a protein-polymer composition wherein said protein is an enzyme, at least two ultraviolet light stabilizers whereby at least one light stabilizer is a sterically hindered amine, and at least one light stabilizer is a UV absorber, said UV absorber present at a concentration in excess of 5% by weight.

24. A process of stabilizing enzyme activity in a protein-polymer curable composition against weathering from ultraviolet light comprising:

adding to a protein-polymer composition wherein said protein is an enzyme, at least two ultraviolet light stabilizers whereby at least one light stabilizer is a sterically hindered amine, and at least one light stabilizer is a UV absorber, said UV absorber present at a concentration in excess of 5% by weight, wherein said sterically hindered amine is 2,4-bis[N-Butyl-N-(1-cyclohexyloxy-2,2,6,6-tetramethylpiperidin-4-yl)amino]-6-(2-hydroxyethylamine)-1,3,5-triazine.

25. The process of claim 23 wherein said sterically hindered amine is present at 1% by weight.

26. The process of claim 23 wherein said UV absorber has a 10% cut-off at a wavelength in excess of 380 nm.

27. The process of claim 23 wherein said UV absorber is added to produce a final concentration of 8% by weight or greater.

* * * * *